United States Patent
Kanda

(10) Patent No.: US 11,455,974 B2
(45) Date of Patent: Sep. 27, 2022

(54) IMAGE PROCESSING DEVICE, IMAGE PROCESSING METHOD, AND IMAGE PROVISION SYSTEM FOR THE DISPLAY OF VIEWPOINT IMAGES OF A SHARED ENVIRONMENT

(71) Applicant: SONY CORPORATION, Tokyo (JP)

(72) Inventor: Satoru Kanda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,574

(22) PCT Filed: Jan. 23, 2019

(86) PCT No.: PCT/JP2019/001940
§ 371 (c)(1),
(2) Date: Jul. 23, 2020

(87) PCT Pub. No.: WO2019/155876
PCT Pub. Date: Aug. 15, 2019

(65) Prior Publication Data
US 2021/0035535 A1  Feb. 4, 2021

(30) Foreign Application Priority Data
Feb. 6, 2018  (JP) .............................. JP2018-019062

(51) Int. Cl.
*G09G 5/377* (2006.01)
*G06F 3/01* (2006.01)
(Continued)

(52) U.S. Cl.
CPC ............. *G09G 5/377* (2013.01); *G06F 3/012* (2013.01); *G09G 5/373* (2013.01); *G09G 5/38* (2013.01);
(Continued)

(58) Field of Classification Search
None
See application file for complete search history.

(56) References Cited

U.S. PATENT DOCUMENTS

2007/0067089 A1* 3/2007 Yoshida ................ G02B 27/01
701/96
2007/0188407 A1* 8/2007 Nishi ................... G02B 25/001
345/8
(Continued)

FOREIGN PATENT DOCUMENTS

CN      107223270 A  *  9/2017  ............. G06T 15/00
JP      2005-211132 A      8/2005
(Continued)

OTHER PUBLICATIONS

"VR Preview", Property Management, vol. 18, No. 10, Oct. 2017, pp. 32-33.
(Continued)

*Primary Examiner* — Patrick F Valdez
(74) *Attorney, Agent, or Firm* — Chip Law Group

(57) ABSTRACT

The present technology relates to an image processing device, an image processing method, and an image provision system that enable simultaneous grasping of an image viewed by a counterpart and a position of the counterpart in a virtual space. An HMD receives a viewpoint image of a user that is an image viewed from a viewpoint of the user in a virtual space, a viewpoint image of another user viewed from a viewpoint of the another user, viewpoint position information indicating a position of the another user, and line-of-sight information indicating a line-of-sight direction of the another user. A display control unit controls display of the viewpoint image of the another user to be superimposed on the viewpoint image of the user on the basis of a positional relationship of the user and the another user in the virtual space determined using the viewpoint position infor-
(Continued)

mation and the line-of-sight information of the another user. The present technology can be applied to a model room preview system.

20 Claims, 32 Drawing Sheets

(51) Int. Cl.
*G09G 5/373* (2006.01)
*G09G 5/38* (2006.01)

(52) U.S. Cl.
CPC ............. *G09G 2340/045* (2013.01); *G09G 2340/0464* (2013.01)

(56) References Cited

U.S. PATENT DOCUMENTS

| | | | |
|---|---|---|---|
| 2009/0237403 A1 | 9/2009 | Horii et al. | |
| 2011/0018968 A1* | 1/2011 | Shikata | H04N 5/232939 348/47 |
| 2012/0140030 A1* | 6/2012 | Togita | H04N 13/172 348/43 |
| 2012/0235990 A1* | 9/2012 | Yamaji | H04N 13/225 345/419 |
| 2014/0149905 A1* | 5/2014 | Woo | G06F 3/0488 715/768 |
| 2016/0191799 A1* | 6/2016 | Salivar | H04N 5/2625 348/39 |
| 2017/0150230 A1* | 5/2017 | Shimura | H04N 21/42203 |
| 2017/0332134 A1* | 11/2017 | Iwami | H04N 21/43076 |
| 2018/0314484 A1* | 11/2018 | Pahud | A63F 13/213 |
| 2019/0052842 A1* | 2/2019 | Du | G06K 9/00979 |
| 2019/0143211 A1* | 5/2019 | Tada | A63F 13/86 463/31 |
| 2019/0318546 A1* | 10/2019 | Wang | G06T 15/04 |

FOREIGN PATENT DOCUMENTS

| | | | | |
|---|---|---|---|---|
| JP | 2009-230344 A | 10/2009 | | |
| JP | 2015-73746 A | 4/2015 | | |
| WO | 2014/115393 A1 | 7/2014 | | |
| WO | WO-2016002445 A1 | * 1/2016 | ............... | G06F 3/011 |
| WO | WO-2016072128 A1 | * 5/2016 | ............ | G06F 3/0346 |
| WO | 2018/012628 A1 | 1/2018 | | |

OTHER PUBLICATIONS

International Search Report and Written Opinion of PCT Application No. PCT/JP2019/001940, dated Mar. 12, 2019, 08 pages of ISRWO.

* cited by examiner

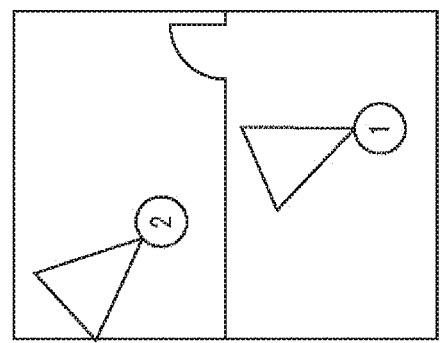
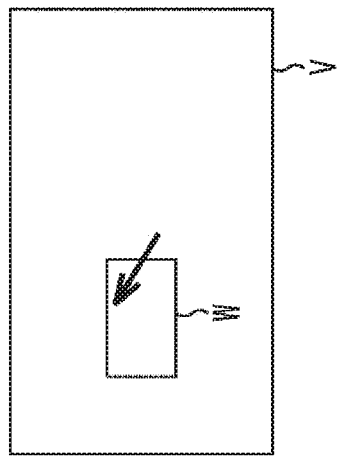
FIG. 22B
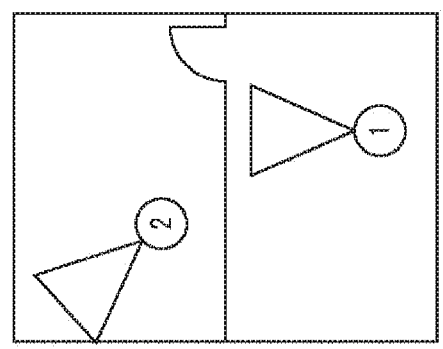
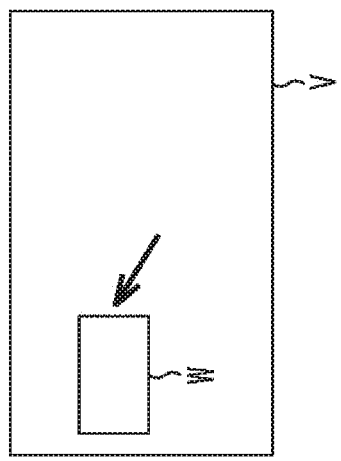
FIG. 22A

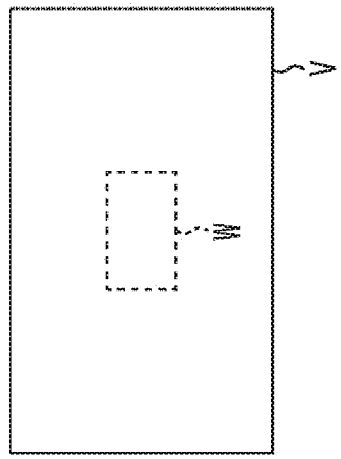
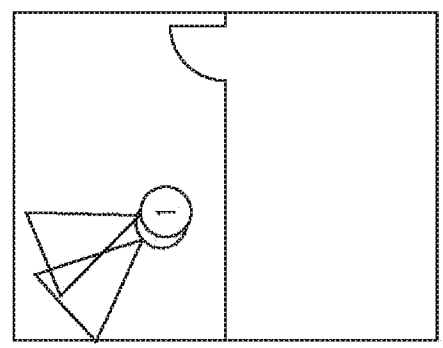
FIG. 24B
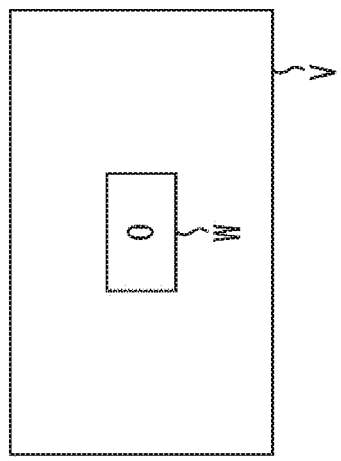
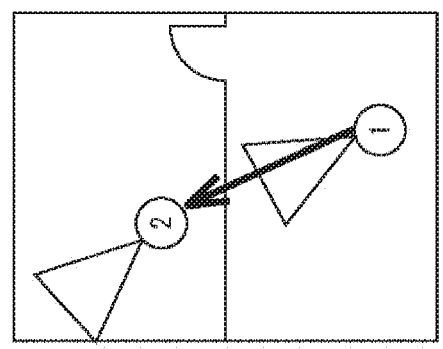
FIG. 24A

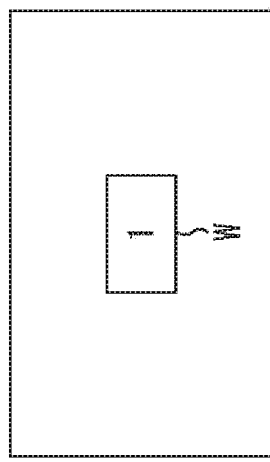
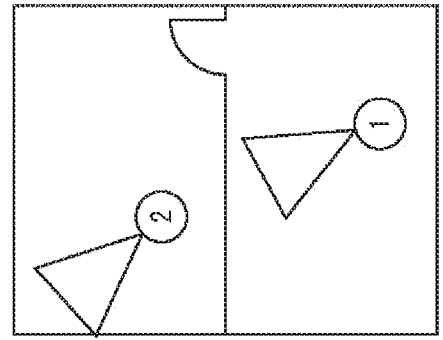
FIG. 26A
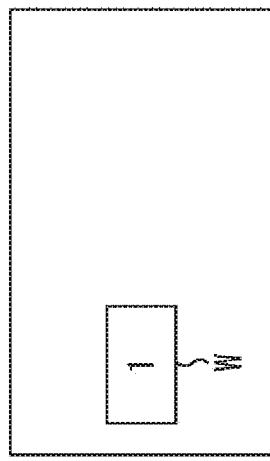
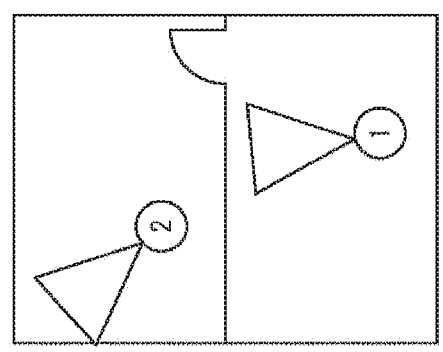
FIG. 26B
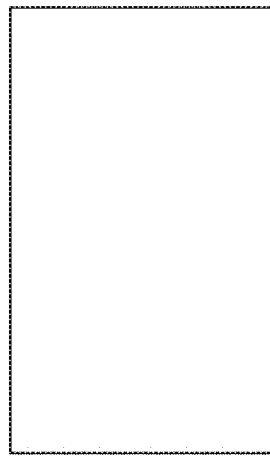
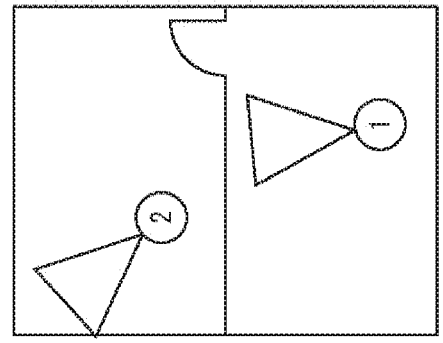
FIG. 26C

IMAGE PROCESSING DEVICE, IMAGE PROCESSING METHOD, AND IMAGE PROVISION SYSTEM FOR THE DISPLAY OF VIEWPOINT IMAGES OF A SHARED ENVIRONMENT

CROSS REFERENCE TO RELATED APPLICATIONS

This application is a U.S. National Phase of International Patent Application No. PCT/JP2019/001940 filed on Jan. 23, 2019, which claims priority benefit of Japanese Patent Application No. JP 2018-019062 filed in the Japan Patent Office on Feb. 6, 2018. Each of the above-referenced applications is hereby incorporated herein by reference in its entirety.

TECHNICAL FIELD

The present technology relates to an image processing device, an image processing method, and an image provision system, and more particularly, to an image processing device, an image processing method, and an image provision system that enable simultaneous grasping of an image viewed by a counterpart and a position of the counterpart in a virtual space.

BACKGROUND ART

Patent Document 1 proposes a technology in which an image in the line-of-sight direction of another user, which can be viewed by a head-mounted display (HMD), is displayed on the HMD used by a user.

CITATION LIST

Patent Document

Patent Document 1: International Publication No. 2014/115393

SUMMARY OF THE INVENTION

Problems to be Solved by the Invention

In the proposal of Patent Document 1, it is difficult to grasp where the user is from the displayed image of the line-of-sight of another user.

The present technology has been made in view of such a situation, and is intended to enable simultaneous grasping of an image viewed by a counterpart and a position of the counterpart in a virtual space.

Solutions of Problems

An image processing device according to an aspect of the present technology includes: a reception unit that receives a viewpoint image of a user that is an image viewed from a viewpoint of the user in a virtual space, a viewpoint image of another user viewed from a viewpoint of the another user, viewpoint position information indicating a position of the another user, and line-of-sight information indicating a line-of-sight direction of the another user; and a display control unit that controls display of the viewpoint image of the another user to be superimposed on the viewpoint image of the user on the basis of a positional relationship of the user and the another user in the virtual space determined using the viewpoint position information and the line-of-sight information of the another user.

An image provision system according to another aspect of the present technology includes: an image processing device including a reception unit that receives a viewpoint image of a user that is an image viewed from a viewpoint of the user in a virtual space, a viewpoint image of another user viewed from a viewpoint of the another user, viewpoint position information indicating a position of the another user, and line-of-sight information indicating a line-of-sight direction of the another user, and a display control unit that controls display of the viewpoint image of the another user to be superimposed on the viewpoint image of the user on the basis of a positional relationship of the user and the another user in the virtual space determined using the viewpoint position information and the line-of-sight information of the another user; and an image provision device including a transmission unit that transmits the viewpoint image of the user and the viewpoint image of the another user to the image processing device at bit rate distribution according to a size or a transmittance of the viewpoint image of the another user.

In an aspect of the present technology, a viewpoint image of a user that is an image viewed from a viewpoint of the user in a virtual space, a viewpoint image of another user viewed from a viewpoint of the another user, viewpoint position information indicating a position of the another user, and line-of-sight information indicating a line-of-sight direction of the another user are received. Then, display of the viewpoint image of the another user to be superimposed on the viewpoint image of the user is controlled on the basis of a positional relationship of the user and the another user in the virtual space determined using the viewpoint position information and the line-of-sight information of the another user.

In another aspect of the present technology, a viewpoint image of a user that is an image viewed from a viewpoint of the user in a virtual space, a viewpoint image of another user viewed from a viewpoint of the another user, viewpoint position information indicating a position of the another user, and line-of-sight information indicating a line-of-sight direction of the another user are received. Then, display of the viewpoint image of the another user to be superimposed on the viewpoint image of the user is controlled on the basis of a positional relationship of the user and the another user in the virtual space determined using the viewpoint position information and the line-of-sight information of the another user. Furthermore, the viewpoint image of the user and the viewpoint image of the another user are transmitted to the image processing device at bit rate distribution according to a size or a transmittance of the viewpoint image of the another user.

Effects of the Invention

According to the present technology, it is possible to simultaneously grasp an image viewed by a counterpart and a position of the counterpart in a virtual space.

Note that the effects described herein are not necessarily limited, and any of the effects described in the present disclosure may be applied.

BRIEF DESCRIPTION OF DRAWINGS

FIGS. 22A and 22B are diagrams showing an example of transition of the display screen of the subscreen in a case where the viewpoint of the user 1 and the viewpoint of the user 2 are different from each other.

FIGS. 24A and 24B are diagrams, following FIGS. 23A and 23B, showing an example of transition of the display screen in a case where the viewpoint of the user 1 and the viewpoint of the user 2 are different from each other.

FIGS. 26A, 26B, and 26C are diagrams, following FIGS. 25A and 25B, showing an example of transition of the display screen in a case where the viewpoint of the user 1 and the viewpoint of the user 2 are different from each other.

MODE FOR CARRYING OUT THE INVENTION

Hereinafter, embodiments for carrying out the present technology will be described. The description will be given in the following order.

1. First embodiment (model room preview system)
2. Second embodiment (another example of model room preview system)
3. Third embodiment (tourism system)

First Embodiment

<Configuration Example of System>

Figure 1:
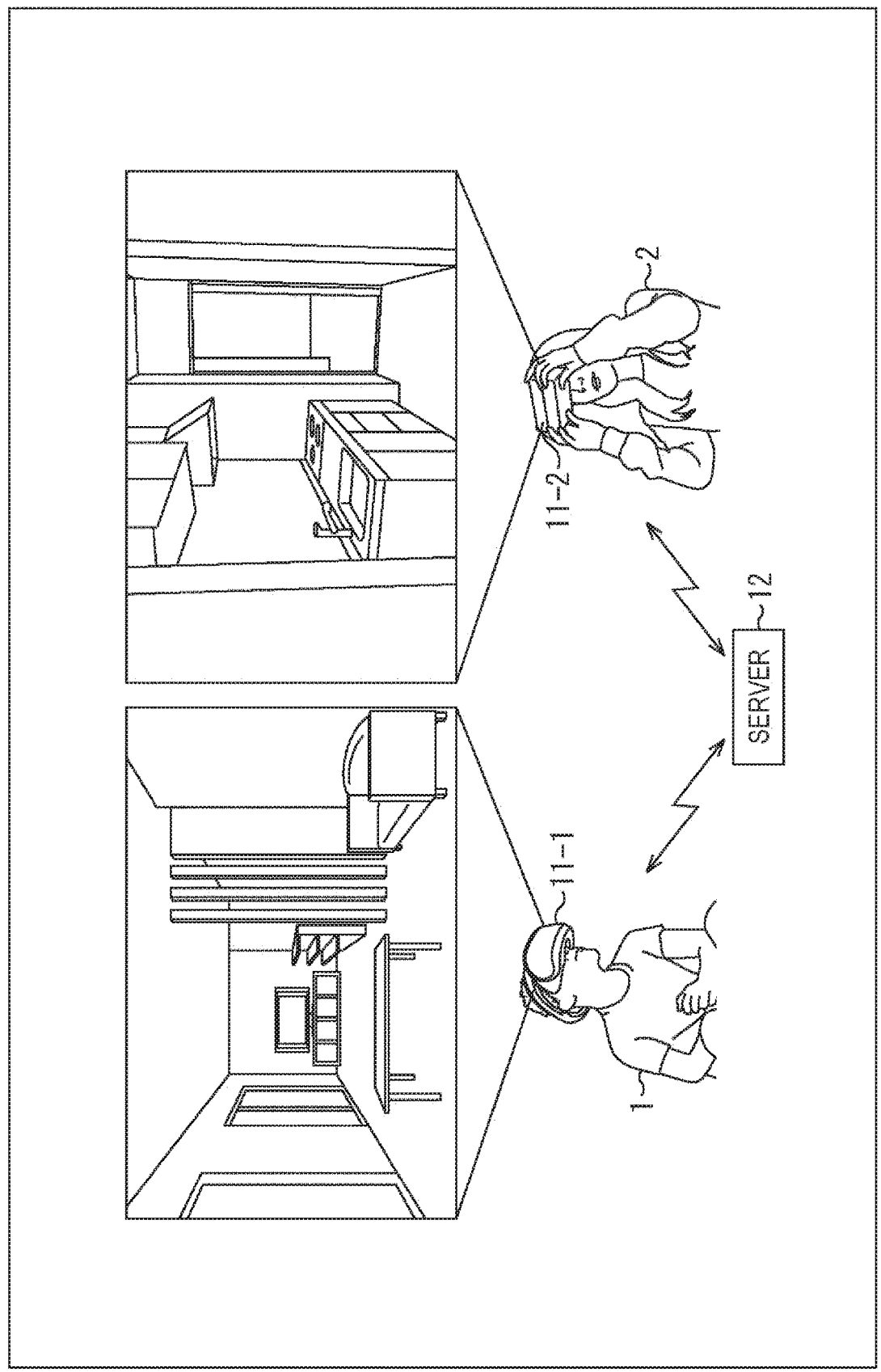
FIG. 1 is a diagram for explaining a model room preview system to which the present technology is applied.

FIG. 1 is a diagram for explaining a model room preview system as an image provision system to which the present technology is applied.

As shown in FIG. 1, the model room preview system is used by a user wearing a head-mounted display (HMD) in a living room or a real estate agent at home to access a server to view the contents of a model room preview service. The model room preview system is used for real estate business and the like. The model room, which is a free viewpoint image space, includes a living room, a kitchen, a bedroom, a toilet, a bathroom, and the like.

In the example of FIG. 1, a user 1, who is a husband, is wearing an HMD 11-1, accesses a server 12, and watches the contents of the living room in the model room. A user 2, who is a wife, is wearing an HMD 11-2, accesses the server 12, and watches the contents of the kitchen in the model room.

The HMD 11-1 transmits viewpoint position information indicating the position of the user 1 and line-of-sight information indicating the line-of-sight direction in the free viewpoint image space to the server 12, and uses the image transmitted from the server 12 to generate a visual field image (view port) that is an image of in the range of the visual field (field of view) of the user 1. As described later, a visual field image displayed on the HMD 11-1 is generated in the HMD 11-1 on the basis of the viewpoint image transmitted from the server 12 and is displayed. Furthermore, the HMD 11-1 controls the display of the generated visual field image of the user 1.

Here, the viewpoint position information is position information indicating the standing position (head position) of the user in the free viewpoint image space. The user can change the standing position by operating a controller (not shown) or the like. Furthermore, the line-of-sight information is vector information starting from a viewpoint indicated by pitch, yaw, or the like for forming the visual field of the user. In a case of the HMD, the user can change his/her line-of-sight by swinging head.

The HMD 11-2 transmits viewpoint position information of the user 2 and line-of-sight information in the free viewpoint image space to the server 12, and uses the image transmitted from the server 12 to generate a visual field image that is an image in the range of the visual field of the user 2. The HMD 11-2 controls the display of the generated visual field image of the user 2.

The server 12 has, as contents that can be viewed using the model room preview system, for example, so-called free viewpoint image space contents including moving images obtained by imaging the model room from a plurality of viewpoints.

The server 12 transmits an image generated on the basis of the viewpoint position information and the line-of-sight information of the user 1 in the free viewpoint image space to the HMD 11-1. The server 12 transmits an image generated on the basis of the viewpoint position information and the line-of-sight information of the user 2 in the free viewpoint image space to the HMD 11-2.

By using the model room preview system, the user can experience the model room with realistic feeling as if he/she were viewing in the model room.

Note that the user can use the model room preview system not only by the HMD but also by setting up a dedicated application using a smartphone or a tablet terminal as the operation terminal.

<Configuration Example of Free Viewpoint Image Space>

Figure 2:
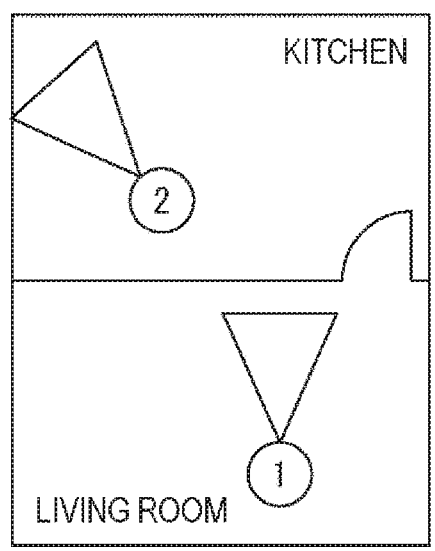
FIG. 2 is a diagram showing a configuration example of a free viewpoint image space.

FIG. 2 is a diagram showing a configuration example of a free viewpoint image space.

FIG. 2 schematically shows a state in which a model room, which is a free viewpoint image space, is viewed from above.

The model room includes a living room and a kitchen. The kitchen is connected to the upper part of the living room through a door provided on the right.

The circle with the numeral 1 indicates the user 1, and the circle with the numeral 2 indicates the user 2. The portion where the circle and the two straight lines meet is the viewpoint position, and the range between the two straight lines extending from the viewpoint indicates the visual field of the user.

The user 1 is in the living room and faces upward. The user 2 is in the kitchen and faces the upper left. The user 2 is located in the upper left direction with respect to the user 1.

The user 1 and the user 2 can go back and forth between the living room and the kitchen via the door.

<Viewpoint Non-Share Mode and Viewpoint Share Mode>

Figure 3:
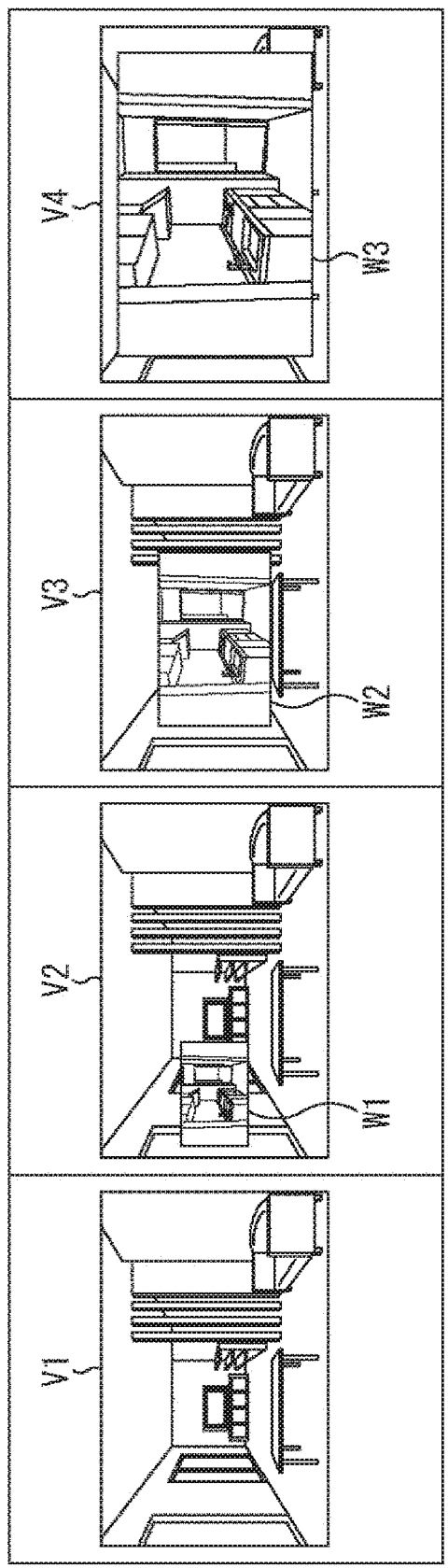
FIG. 3 is a diagram showing examples of display screens in a viewpoint non-share mode and a viewpoint share mode.

FIG. 3 is a diagram showing examples of display screens in a viewpoint non-share mode and a viewpoint share mode in the HMD 11-1.

The model room preview system has the viewpoint non-share mode and the viewpoint share mode as display modes. The viewpoint non-share mode is a display mode in which each user displays his or her own visual field image. The viewpoint share mode is a display mode in which the visual field image of another user is shared by superimposing and displaying the visual field image of the another user on his/her own visual field image.

When the HMD 11-1 and HMD 11-2 log in to the model room preview service, the viewpoint position information and the line-of-sight information of the user 1 and the viewpoint position information and the line-of-sight information of the user 2 are transmitted to the server 12.

The server 12 transmits to the HMD 11-1 the viewpoint image of the user 1 viewed from the viewpoint of the user 1 generated on the basis of the viewpoint position information of the user 1 in the free viewpoint image space. The server 12 transmits to the HMD 11-2 the viewpoint image of the user 2 viewed from the viewpoint of the user 2 generated on the basis of the viewpoint position information of the user 2 in the free viewpoint image space.

A display screen in the viewpoint non-share mode is displayed on the HMD 11-1 and the HMD 11-2.

A display screen V1 is a screen in the viewpoint non-share mode. As shown on the display screen V1, the HMD 11-1 controls the display of the visual field image (living room) of the user 1 generated according to the visual field of the HMD 11-1 using the viewpoint image supplied from the server 12. Although not shown, the HMD 11-2 controls the display of the visual field image (kitchen) of the user 2 generated according to the visual field of the HMD 11-2 using the viewpoint image supplied from the server 12.

The HMD 11-2 transmits to the server 12 a viewpoint share request signal, which is a signal requesting the viewpoint share for requesting the user 1 to view the kitchen facilities that the user 2 is viewing, on the basis of the operation of the user 2. The server 12 transmits to the HMD 11-1 the viewpoint position information and the line-of-sight information of the user 2 in the free viewpoint image space, and the viewpoint image of the user 2 generated on the basis of the viewpoint position information and the line-of-sight information of the user 2.

A display screen V2 is a screen in the viewpoint share mode. The HMD 11-1 generates and displays the display screen V2 in which the visual field image of the user 2 is superimposed on the visual field image of the user 1 as a subscreen W1. The visual field image of the user 2 displayed on the HMD 11-1 is an image generated using the viewpoint image supplied from the server 12 according to the visual field of the subscreen.

On the display screen V2, the user 1 turns the line-of-sight to the subscreen W1. In response to this, the HMD 11-1 generates a display screen V3 obtained by moving a subscreen W2 to the center of the visual field image of the user 1, making the subscreen W2 enlarged, and superimposing the subscreen W2, and causes the display screen V3 to be displayed.

Moreover, in the display screen V3, in a case where the line-of-sight of the user 1 matches the center of the subscreen, the HMD 11-1 generates a display screen V4 obtained by superimposing a subscreen W3 made substantially largest on the visual field image of the user 1, and causes the display screen V4 to be displayed.

As described above, in the HMD 11-1, the visual field image of the kitchen that the user 2 is viewing is superimposed on the visual field image of the living room viewed by the user 1. That is, in the model room preview system, the visual field image that the user is viewing at can be shared with other users.

Furthermore, as described above, the ratio of the bit rate in the server 12 is controlled according to the size of the subscreen (gaze region) on the display screen that the user 1 is viewing.

In a case of the display screen V1 in the viewpoint non-share mode, the server 12 allocates all bit rates to the viewpoint image of the user 1 and transmits the image.

In a case of the display screen V2 in the viewpoint share mode, the server 12 simultaneously transmits the viewpoint image of the user 1 and the viewpoint image of the user 2, but the bit rate allocation to the viewpoint image of the user 2 is still low.

In a case of the display screen V3 in the viewpoint share mode, the server 12 simultaneously transmits the viewpoint image of the user 1 and the viewpoint image of the user 2. At this time, in order to transmit the viewpoint image of the user 2 preferentially, the server 12 increases the bit rate allocation to the viewpoint image of the user 2.

In a case of the display screen V4 in the viewpoint share mode, the server 12 simultaneously transmits the viewpoint image of the user 1 and the viewpoint image of the user 2. At this time, the server 12 makes the bit rate allocation to the viewpoint image of the user 2 the largest with the highest priority.

<Configuration Example of Server>

Figure 4:
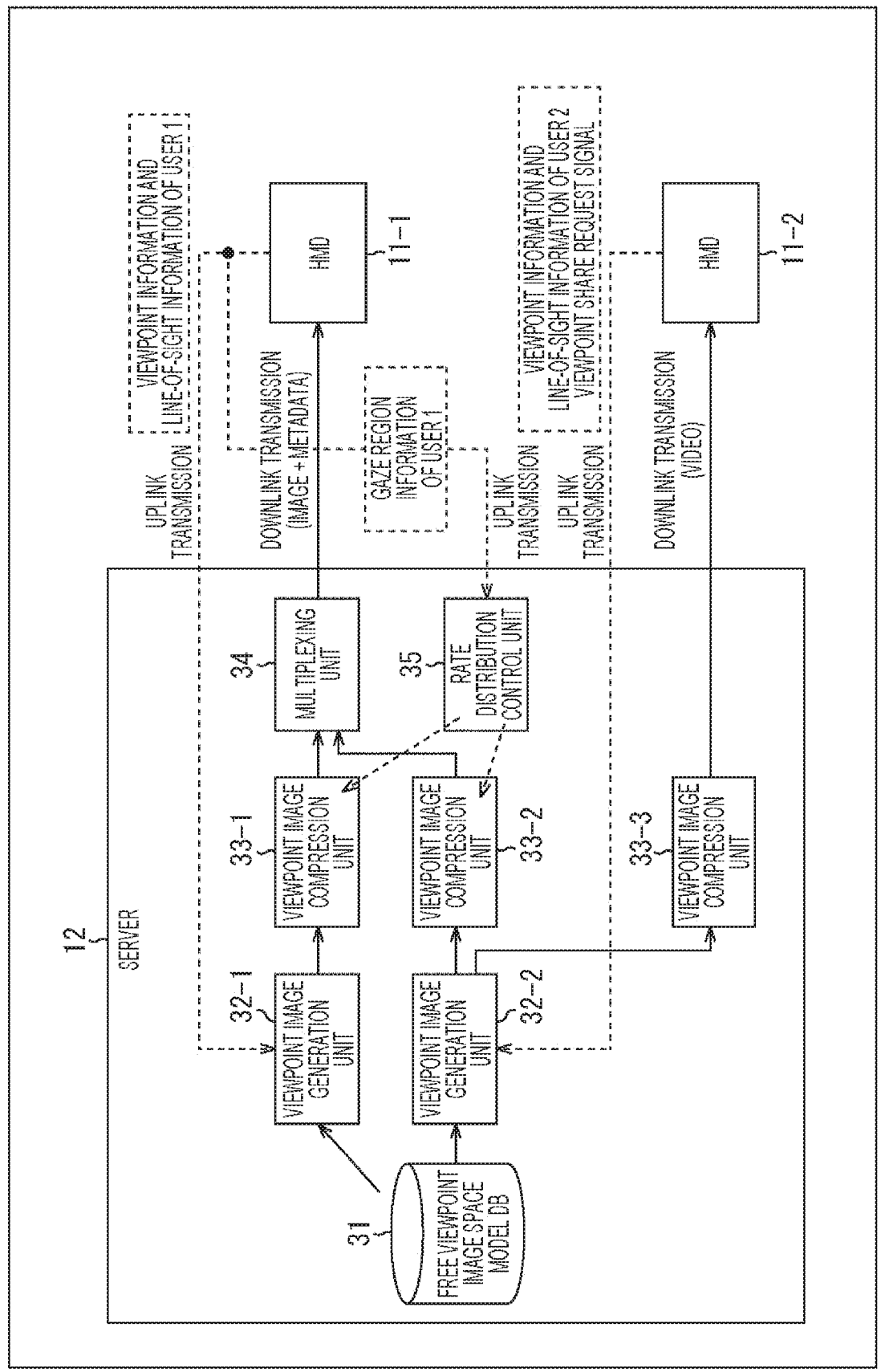
FIG. 4 is a block diagram showing a configuration example of a server.

FIG. 4 is a block diagram showing a configuration example of a server.

The server 12 includes a free viewpoint image space model DB 31, a viewpoint image generation unit 32-1, a viewpoint image generation unit 32-2, a viewpoint image compression unit 33-1, a viewpoint image compression unit 33-2, and a viewpoint image compression unit 33-3, a multiplexing unit 34, and a rate distribution control unit 35.

In the drawing, uplink transmission indicates transmission from the HMD 11-1 or 11-2 to the server 12, and downlink transmission indicates transmission from the server 12 to the HMD 11-1 or 11-2.

The viewpoint position information and the line-of-sight information of the user 1 transmitted from the HMD 11-1 are supplied to the viewpoint image generation unit 32-1. The gaze region information of the user 1 transmitted from the HMD 11-1 and indicating the size of the subscreen at which the user 1 is gazing is supplied to the rate distribution control unit 35. The viewpoint position information and the line-of-sight information of the user 2 and the viewpoint share request signal from the HMD 11-2 are supplied to the viewpoint image generation unit 32-2. The gaze region information of the user 1 may be information indicating the transmittance of the subscreen that the user 1 is gazing at.

The free viewpoint image space model DB 31 stores an omnidirectional image of a free viewpoint including a moving image obtained by imaging the model room from a plurality of viewpoints. The degree of freedom of the omnidirectional image is 6 degree of freedom (DoF), which is the degree of freedom of the free viewpoint image. Note that the degree of freedom of the omnidirectional image may be a degree obtained by adding a plurality of viewpoints (one or more viewpoints) to the 3DoF which is the degree of freedom in a case of 360° viewpoint fixed look-around type virtual reality (VR).

The viewpoint image generation unit 32-1 uses the omnidirectional image of the free viewpoint image space model DB 31 to generate the omnidirectional image of the viewpoint of the user 1 that is the viewpoint image of the user 1 on the basis of the viewpoint position information and the line-of-sight information of the user 1 supplied from the HMD 11-1. The viewpoint image generation unit 32-1 outputs the generated omnidirectional image of the viewpoint of the user 1 to the viewpoint image compression unit 33-1.

The viewpoint image generation unit 32-2 uses the omnidirectional image of the free viewpoint image space model DB 31 to generate the omnidirectional image of the viewpoint of the user 2 that is the viewpoint image of the user 2 on the basis of the viewpoint position information and the line-of-sight information of the user 2 supplied from the HMD 11-2. The viewpoint image generation unit 32-2 outputs the generated omnidirectional image of the viewpoint of the user 2 to the viewpoint image compression unit 33-3. Furthermore, in a case where the viewpoint share request signal is supplied from the HMD 11-2, the viewpoint image generation unit 32-2 outputs the generated omnidirectional image of the viewpoint of the user 2 also to the viewpoint image compression unit 33-2.

In a case of the viewpoint non-share mode, the viewpoint image compression unit 33-1 performs equirectangular projection (ERP) projection conversion of the omnidirectional image of the viewpoint of the user 1 to generate a compression ERP image of the user 1. In a case of the viewpoint share mode, the compression ERP image of the user 1 is generated on the basis of the bit rate control signal for controlling the bit rate supplied from the rate distribution control unit 35. The viewpoint image compression unit 33-1 outputs the generated compressed ERP image of the user 1 to the multiplexing unit 34. Note that the conversion method is not limited to the ERP.

In a case of the viewpoint share mode, the viewpoint image compression unit 33-2 performs ERP projection conversion of the omnidirectional image of the viewpoint of the user 2 on the basis of the bit rate control signal for controlling the bit rate supplied from the rate distribution control unit 35 to generate a compression ERP image of the user 2. The viewpoint image compression unit 33-2 outputs the generated compressed ERP image of the user 2 to the multiplexing unit 34.

The viewpoint image compression unit 33-3 performs ERP projection conversion to the omnidirectional image of the viewpoint of the user 2 to generate a compression ERP image of the user 2. The viewpoint image compression unit 33-3 transmits the generated compression ERP image of the user 2 to the HMD 11-2.

In a case of the viewpoint non-share mode, the multiplexing unit 34 uses the compression ERP image of the user 1 supplied from the viewpoint image compression unit 33-1 to generate a compression image stream. In a case of the viewpoint share mode, the multiplexing unit 34 multiplexes the compression ERP image of the user 1 supplied from the viewpoint image compression unit 33-1, and the compression ERP image of the user 2 supplied from the viewpoint image compression unit 33-2 to generate a compression image stream. The multiplexing unit 34 transmits the compression image stream to the HMD 11-1. At this time, the viewpoint position information and the line-of-sight information of the user 2 are also transmitted as metadata.

In a case of the viewpoint share mode, the rate distribution control unit 35 controls the bit rate distribution of the omnidirectional image of the viewpoint of the user 1 and the omnidirectional image of the viewpoint of the user 2 on the basis of the gaze region information of the user 1 supplied from the HMD 11-1. The rate distribution control unit 35 outputs a rate control signal for controlling the bit rate distribution between the viewpoint image of the user 1 and the viewpoint image of the user 2 to the viewpoint image compression unit 33-1 and the viewpoint image compression unit 33-2.

<Configuration Example of HMD>

Figure 5:
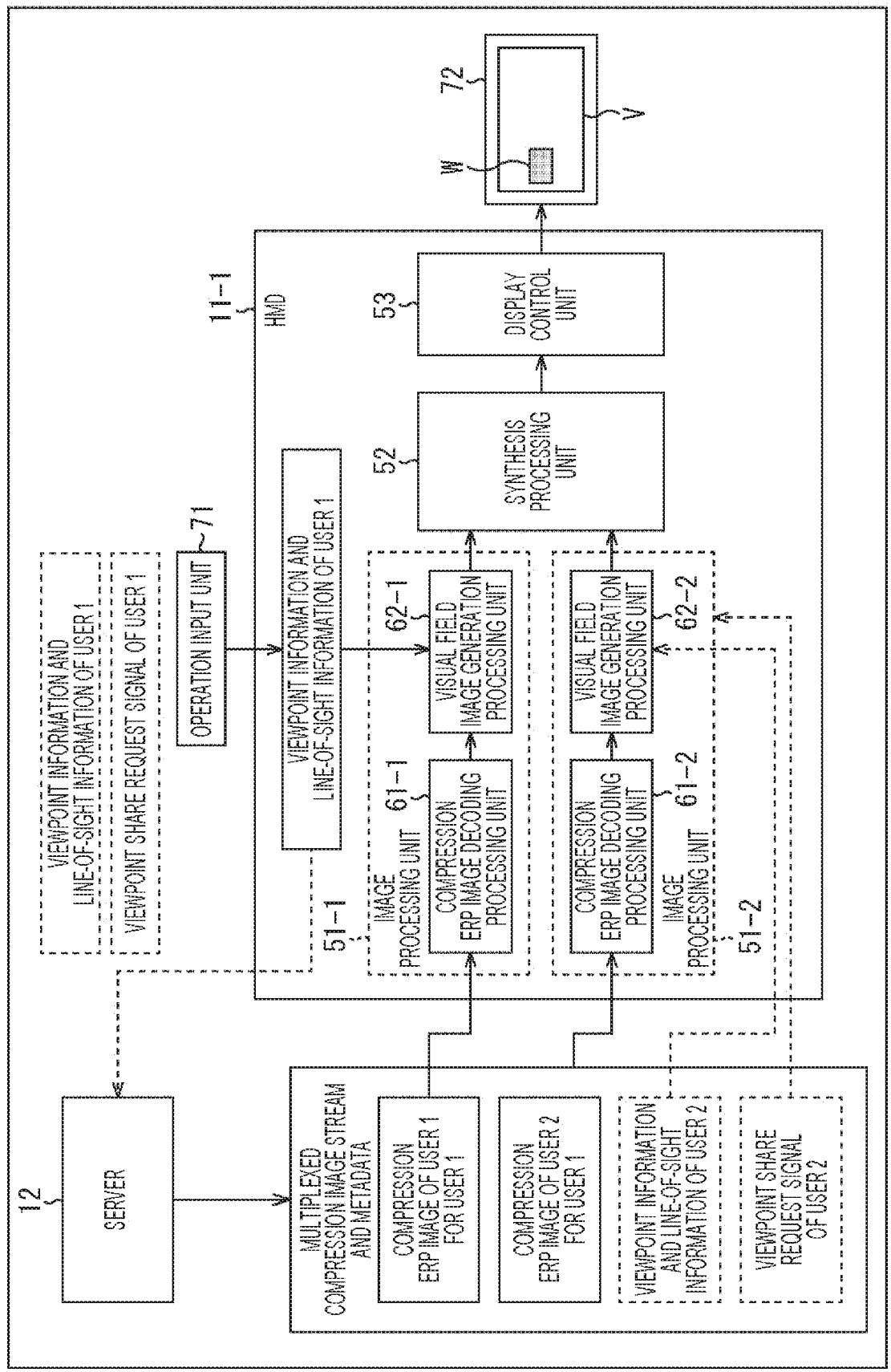
FIG. 5 is a block diagram showing a configuration example of an HMD.

FIG. 5 is a block diagram showing a configuration example of the HMD.

The HMD 11-1 includes an image processing unit 51-1, an image processing unit 51-2, a synthesis processing unit 52, and a display control unit 53.

In a case of the viewpoint non-share mode, the server 12 transmits a compression image stream including the compression ERP image of the user 1 for the user 1.

On the other hand, in a case where the viewpoint share request signal is received from the HMD 11-2, the server 12 transmits a multiplexed compressed image stream including the compression ERP image of the user 1 for the user 1 and the compression ERP image of the user 2 for the user 1. Furthermore, the server 12 transmits the viewpoint share request signal of the user 2, and the viewpoint position information and the line-of-sight information of the user 2 as metadata.

The compression ERP image of the user 1 for the user 1 is supplied to the image processing unit 51-1. The compression ERP image and the metadata of the user 2 for the user 1 are supplied to the image processing unit 51-2.

In the HMD 11-1, the viewpoint position information and the line-of-sight information of the user 1 are input from the operation input unit 71, supplied to the image processing unit 51-1 and transmitted to the server 12. The operation input unit 71 includes a controller, an acceleration sensor installed on the HMD 11-1, or the like. The acceleration sensor includes a gyroscope, a MEMS sensor, and the like, and is mounted on an HMD or a mobile terminal. The acceleration sensor has, for example, a function of detecting a movement of a user and moving a line-of-sight vector.

Furthermore, the viewpoint position information and the line-of-sight information of the user 1 are transmitted also to the server 12. Note that a viewpoint share request signal of the user 1 indicating a request of the user 1 for viewpoint share with another user is also transmitted to the server 12 in response to the request of the user 1.

The image processing unit 51-1 performs predetermined image processing on the compression ERP image of the user 1. The image processing unit 51-1 includes a compression ERP image decoding processing unit 61-1 and a visual field image generation processing unit 62-1.

The compression ERP image decoding unit 61-1 decodes the compression ERP image of the user 1 to generate an ERP image of the user 1. The compression ERP image decoding processing unit 61-1 outputs the generated ERP image to the visual field image generation processing unit 62-1.

The visual field image generation processing unit 62-1 uses the ERP image of the user 1 and generates the visual field image of the user 1 according to the visual field of the HMD 11-1, on the basis of the viewpoint position information and the line-of-sight information of the user 1. The visual field image generation processing unit 62-1 outputs the generated visual field image of the user 1 to the synthesis processing unit 52.

The viewpoint position information and the line-of-sight information of the user 1 are also output to the synthesis processing unit 52. Note that the size of the visual field of the visual field image may be limited by the performance of the display device.

In a case of receiving the viewpoint share request signal of the user 2, the image processing unit 51-2 performs predetermined image processing on the compression ERP image of the user 2. The image processing unit 51-2 includes a compression ERP image decoding processing unit 61-2 and a visual field image generation processing unit 62-2.

The compression ERP image decoding unit 61-2 decodes the compression ERP image of the user 2 to generate an ERP image of the user 2. The compression ERP image decoding processing unit 61-2 outputs the generated ERP image to the visual field image generation processing unit 62-2.

The visual field image generation processing unit 62-2 uses the ERP image of the user 2, generates the visual field image of the user 2 according to the visual field of the subscreen W, on the basis of the viewpoint position information and the line-of-sight information of the user 2, and outputs the generated visual field image of the user 2 to the synthesis processing unit 52. The viewpoint position information and the line-of-sight information of the user 2 are also output to the synthesis processing unit 52.

The synthesis processing unit 52 generates a display screen V by superimposing the subscreen W including the visual field image of the user 2 on the visual field image of the user 1. In a case where there is no visual field image of the user 2 in the viewpoint non-share mode, the synthesis processing unit 52 generates the display screen V using the visual field image of the user 1. The synthesis processing unit 52 outputs the generated display screen V to the display control unit 53.

The display control unit 53 causes the output unit 72 to output the display screen V supplied from the synthesis processing unit 52. The output unit 72 includes an LCD, an organic EL or the like.

<Example of Initial Display Position of Subscreen>

Figure 6:
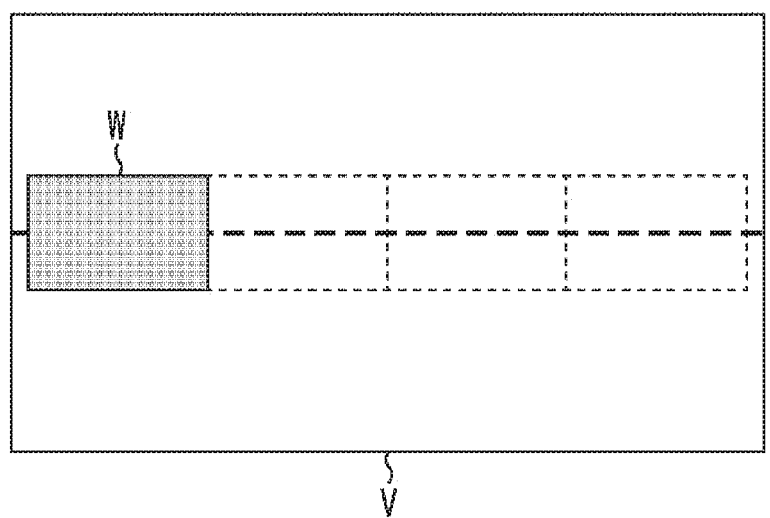
FIG. 6 is a diagram showing an example of an initial display position of a subscreen.

FIG. 6 is a diagram showing an example of an initial display position of a subscreen.

The display screen V represents the visual field of the user 1. The horizontal size of the subscreen W is set to be approximately one fourth of the horizontal direction of the visual field of the display screen V.

The vertical initial position of the subscreen W is determined so that the vertical center of the visual field of the display screen V indicated by the thick broken line and the vertical center of the visual field of the subscreen W match.

The horizontal initial position of the subscreen W is a display area of a left quarter or a right quarter of the visual field of the display screen V. In FIG. 6, the subscreen W is arranged at the left quarter of the visual field of the display screen V.

<Example of Initial Display Position of Subscreen>

Figure 7:
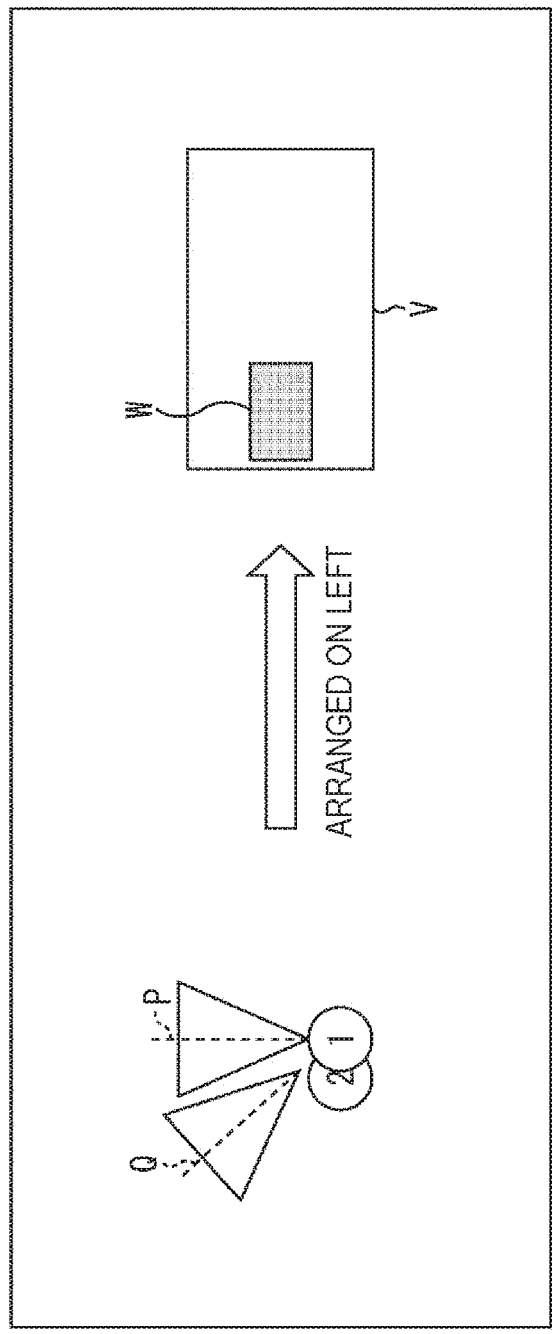
FIG. 7 is a diagram showing an example of an initial display position in the horizontal direction of the subscreen in a case where a viewpoint of a user 1 and a viewpoint of a user 2 are the same.

FIG. 7 is a diagram showing an example of an initial display position in the horizontal direction of the subscreen in a case where a viewpoint of a user 1 and a viewpoint of a user 2 are the same.

In FIG. 7, a line-of-sight vector P indicated by a broken line represents a line-of-sight vector of the user 1, and a line-of-sight vector Q indicated by a broken line represents a line-of-sight vector of the user 2.

In a case where the viewpoints of the user 1 and the viewpoint of the user 2 are the same, the horizontal initial display position of the subscreen is determined depending on which side of right and left the line-of-sight vector Q of the user 2 is with respect to the line-of-sight vector P of the user 1.

In a case of FIG. 7, since the line-of-sight vector Q of the user 2 is on the left of the line-of-sight vector P of the user 1, the subscreen W is arranged on the left of the display screen V.

Figure 8:
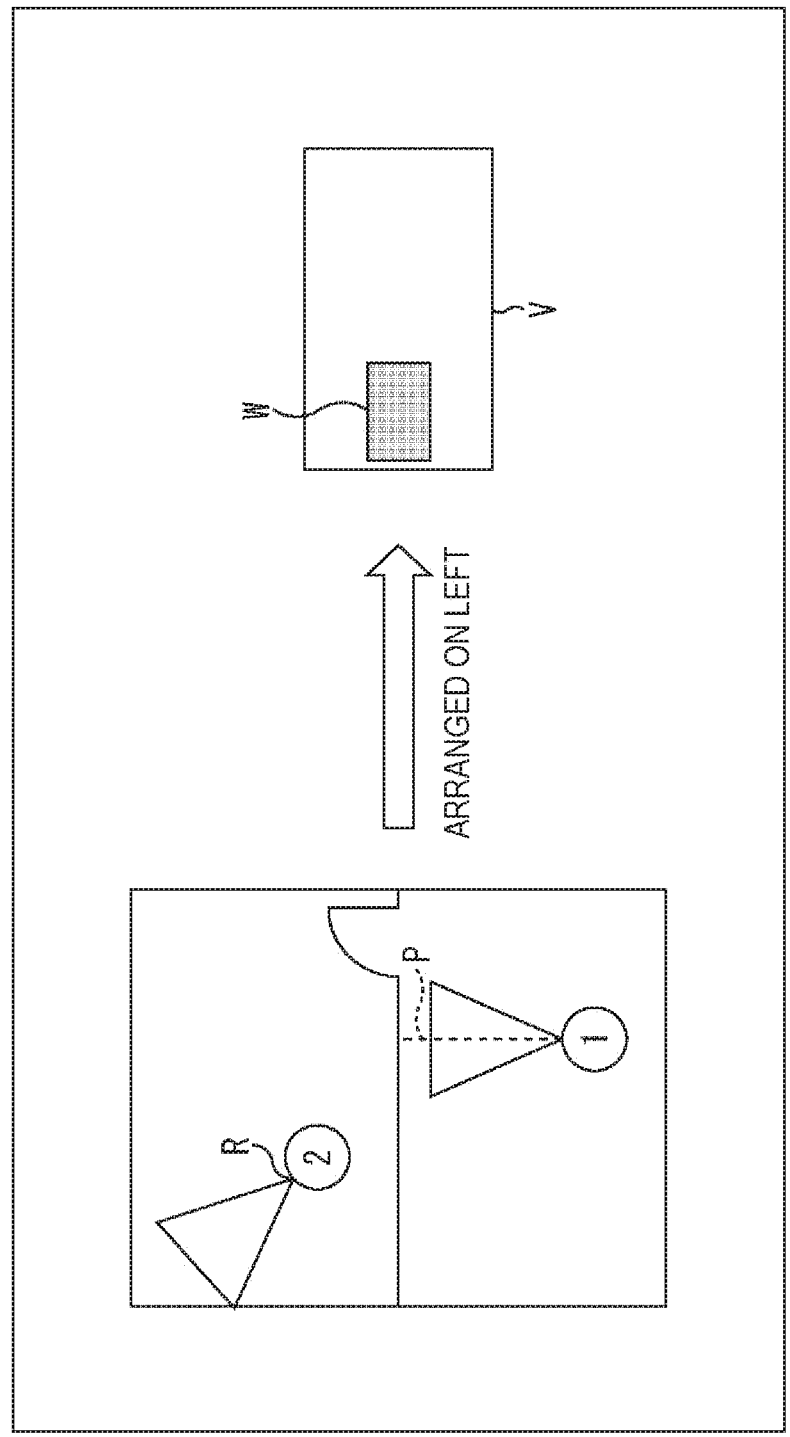
FIG. 8 is a diagram showing an example of the initial display position in the horizontal direction of the subscreen in a case where the viewpoint of the user 1 and the viewpoint of the user 2 are different from each other.

FIG. 8 is a diagram showing an example of the initial display position in the horizontal direction of the subscreen in a case where the viewpoint of the user 1 and the viewpoint of the user 2 are different from each other.

In FIG. 8, the line-of-sight vector P indicated by a broken line represents the line-of-sight vector of the user 1, and the contact point between the circle and the triangle indicated by the numeral 2 represents the viewpoint position R of the user 2.

In a case where the viewpoints of the user 1 and the viewpoint of the user 2 are different, the horizontal initial display position of the subscreen is determined depending on which side of right and left the viewpoint position R of the user 2 is with respect to the line-of-sight vector P of the user 1.

In a case of FIG. 8, since the viewpoint position R of the user 2 is on the left of the line-of-sight vector P of the user 1, the subscreen W is arranged on the left of the display screen V.

Note that FIGS. 7 and 8 show examples of the display position, the horizontal initial display position of the subscreen may be arranged without any particular meaning.

<Example of Change in Display Position of Subscreen>

Figure 9:
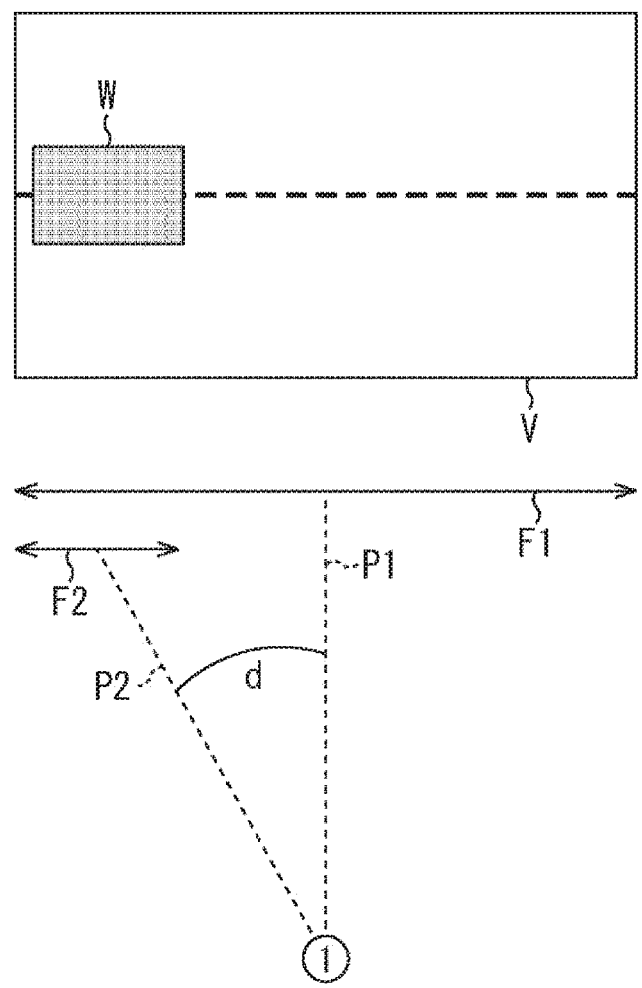
FIG. 9 is a diagram showing an example of a display screen in a case where the size of the subscreen is an initial display state.

FIG. 9 is a diagram showing an example of a display screen in a case where the size of the subscreen is an initial display state.

FIG. 9 shows the display screen V in an initial display state in which the size of the subscreen W is approximately one-fourth of the horizontal size of the visual field of the display screen V.

A line-of-sight vector P1 in a case where the user 1 views the center of a horizontal size F1 of the visual field of the display screen V, and a line-of-sight vector P2 in a case where the user 1 views the center of a horizontal size F2 of the visual field of the subscreen W are defined by the horizontal size F1 of the visual field of the display screen V and the horizontal size F2 of the visual field of the subscreen W.

That is, the line-of-sight vector P1 is determined according to the horizontal size F1 of the visual field of the display screen V, and the line-of-sight vector P2 is determined according to the determination of the initial display position of the subscreen W. The parallax, which is displacement between the determined line-of-sight vector P1 and the line-of-sight vector P2, determined as an angle is a parallax angle d. The subscreen W is displayed in an enlarged manner according to the parallax angle d, goes out of the visual field, or finally disappears from the visual field.

Figure 10:
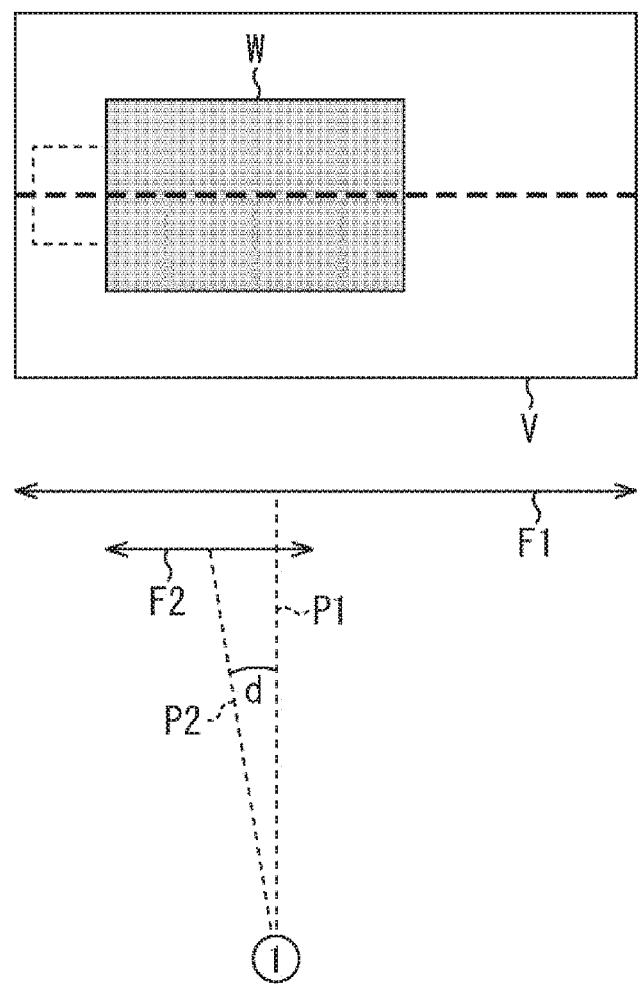
FIG. 10 is a diagram showing an example of a display screen in a state where the size of the subscreen is displayed in an enlarged size.

FIG. 10 is a diagram illustrating an example of the display screen in a state where the size of the subscreen is enlarged and displayed.

FIG. 10 shows the display screen V in which the size of the subscreen W is approximately half the horizontal size of the visual field of the display screen V. The broken-line rectangle indicates the position of the subscreen in the initial display state in FIG. 9.

From the display screen V in the initial display state, when the user 1 swings head with the HMD 11-1 in a direction in which displacement between the two line-of-sight vectors P1 and P2, that is, the parallax angle d decreases, the subscreen W is moved from the broken-line rectangle position to the center of the display screen V and is displayed in an enlarged size.

Figure 11:
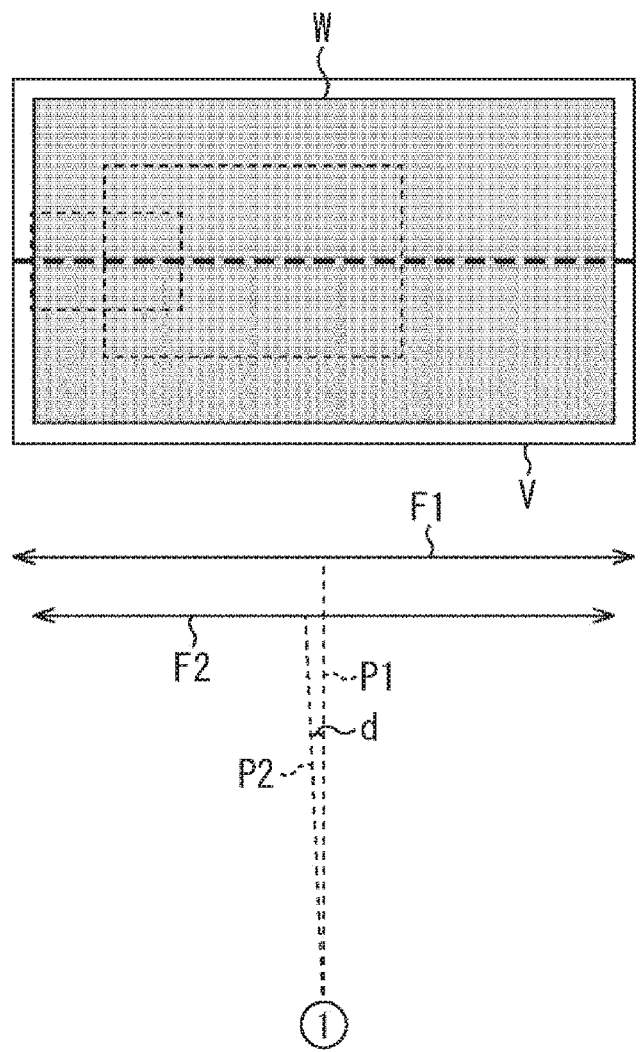
FIG. 11 is a diagram showing an example of a display screen in a state where the size of the subscreen is displayed in the maximum size.

FIG. 11 is a diagram showing an example of a display screen in a state where the size of the subscreen is displayed in the maximum size.

FIG. 11 shows the display screen V in which the size of the subscreen W is approximately 95% of the horizontal size of the visual field of the display screen V. The two broken-line rectangles indicate, from the left, the position of the subscreen in the initial display state of FIG. 9 and the position of the subscreen in the display state of FIG. 10.

In a case where the two line-of-sight vectors P1 and P2 substantially coincide with each other, or in a case where the parallax angle d becomes equal to or smaller than a predetermined threshold, the size of the subscreen W is substantially maximized. At this time, the center position of the subscreen W is moved from the position of the broken-line rectangle to the center position of the display screen V and displayed.

Figure 12:
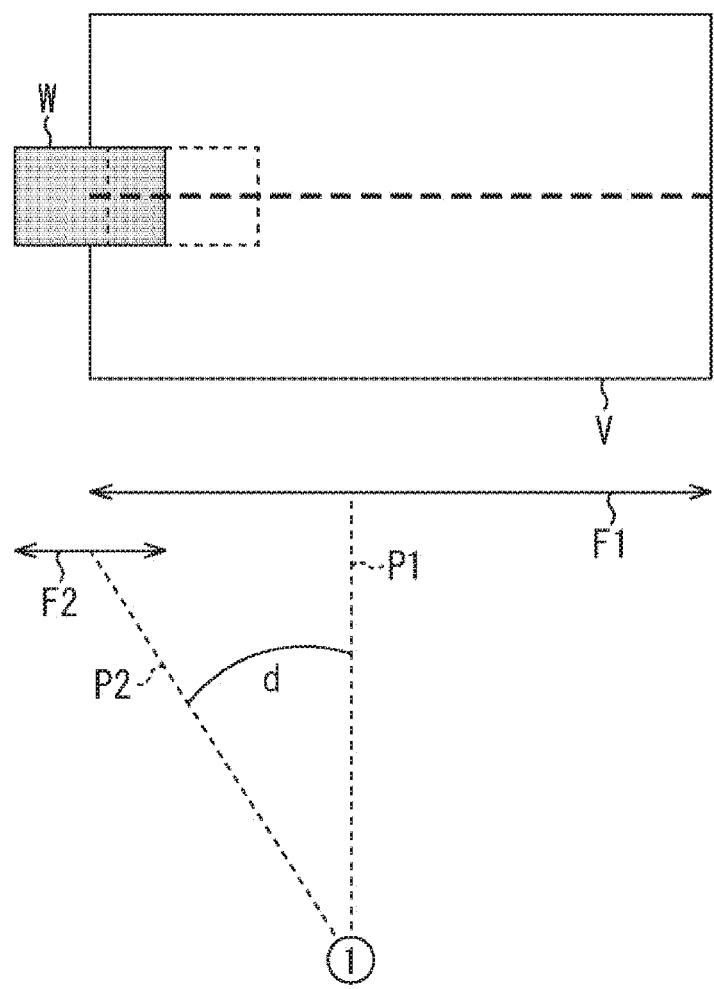
FIG. 12 is a diagram showing an example of a display screen in a state where the subscreen is out of the visual field of the display screen.

FIG. 12 is a diagram showing an example of a display screen in a state where the subscreen is out of the visual field of the display screen.

FIG. 12 shows the display screen V in a state of being displaced from the visual field while the size of the subscreen W remains approximately one-fourth of the horizontal size of the visual field of the display screen V. The broken-line rectangle indicates the subscreen in the initial display state in FIG. 9.

From the display screen V in the initial display state, the user 1 swings head with the HMD 11-1 in a direction in which the parallax angle d between the two line-of-sight vectors P1 and P2 increases. The subscreen W is moved from the position indicated by the broken-line rectangle in a direction out of the visual field of the user 1 with the size kept in the initial state.

Figure 13:
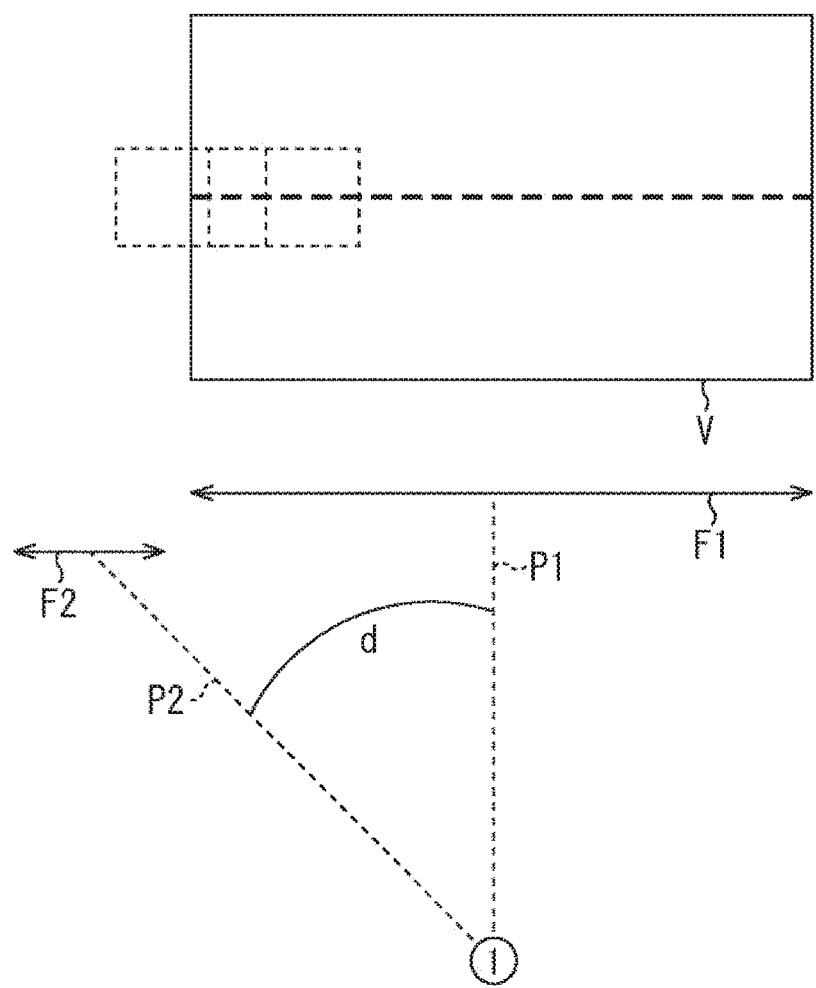
FIG. 13 is a diagram showing an example of a display screen in a state where the subscreen has disappeared from the visual field of the display screen.

FIG. 13 is a diagram showing an example of a display screen in a state where the subscreen has disappeared from the visual field of the display screen.

FIG. 13 shows the display screen V in a state of being disappeared from the visual field while the size of the subscreen W remains approximately one-fourth of the horizontal size of the visual field of the display screen V. The broken-line rectangles indicate, from the right, the subscreen in the initial display state of FIG. 9 and the subscreen in the display state of FIG. 12.

When the parallax angle d between the two line-of-sight vectors P1 and P2 further increases due to the swinging of the HMD 11-1 of the user 1, the subscreen W disappears from the visual field of the display screen V.

As described above, the subscreen W is displayed in an enlarged manner according to the parallax angle d, displayed out of the visual field, or finally disappears from the visual field.

<Example of Subscreen Display Ratio and Bit Rate Allocation>

Figure 14:
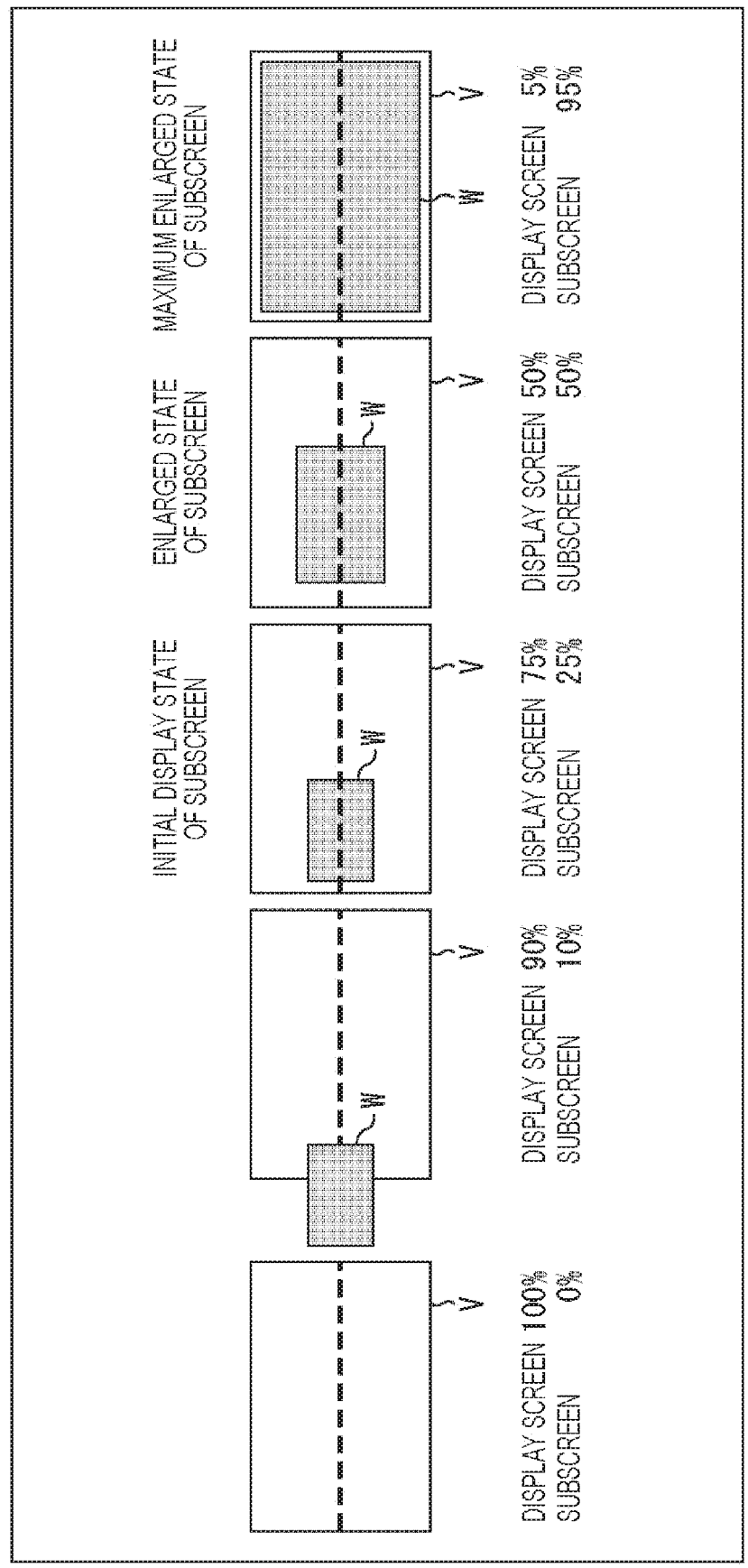
FIG. 14 is a diagram showing an example of a display ratio of the subscreen and bit rate allocation distribution.

FIG. 14 is a diagram showing an example of a display ratio of the subscreen and bit rate allocation distribution.

FIG. 14 shows, from the left, each of the display screens of the state in which the subscreen W disappears, the state in which the subscreen W is being displaced, the initial display state of the subscreen, the enlarged state of the subscreen W, and the maximum enlarged state of the subscreen. Below each display screen, the bit rate allocation distribution of the display screen and the subscreen in each state is shown.

In the state where the sub-screen disappears, the display ratio between the display screen and the subscreen is 100% to 0%. In the state where the sub-screens are being displaced, the display ratio between the display screen and the subscreen is 90% to 10%. In the initial display state of the subscreen, the display ratio between the display screen and the subscreen is 75% to 25%. In the enlarged state of the subscreen, the display ratio between the display screen and the subscreen is 5% to 95%.

The parallax angle of the user 1 is 90 degrees for each of the left and right. The parallax angle when the size of the subscreen becomes approximately one-fourth is 90/4=22.5°. Since the parallax angle of the left half is 45°, the parallax angle of the line-of-sight vector when the subscreen of 22.5° is arranged at the left end of the screen is 45-22.5/2=33.75°.

Moreover, the line-of-sight coincidence ratio, which is the coincidence ratio between the line-of-sight direction of the user 1 and the line-of-sight direction of the user 2, is defined according to the value of the parallax angle.

(1) In a case where the parallax angle initial value is 33.75° and the screen size is ¼, the line-of-sight coincidence rate is 25%.

(2) In a case where the parallax angle is the minimum value of 0 degrees and the screen size is 100% (actually, the main screen is left slightly in the vicinity as the upper limit of 95%), the line-of-sight coincidence rate is 100%.

In a case where the parallax angle is 33.75° or more, the parallax coincidence rate is reduced to 0% to 25% according to the change rate obtained from the two points (1) and (2) described above and the increase in the parallax angle.

As described above, the bit rate distribution can be made variable according to the parallax coincidence rate or the display rate corresponding to the head swinging of the HMD. Note that the bit rate distribution may be made variable according to the transmittance as described later in a second embodiment.

<HMD Operation>

Figure 15:
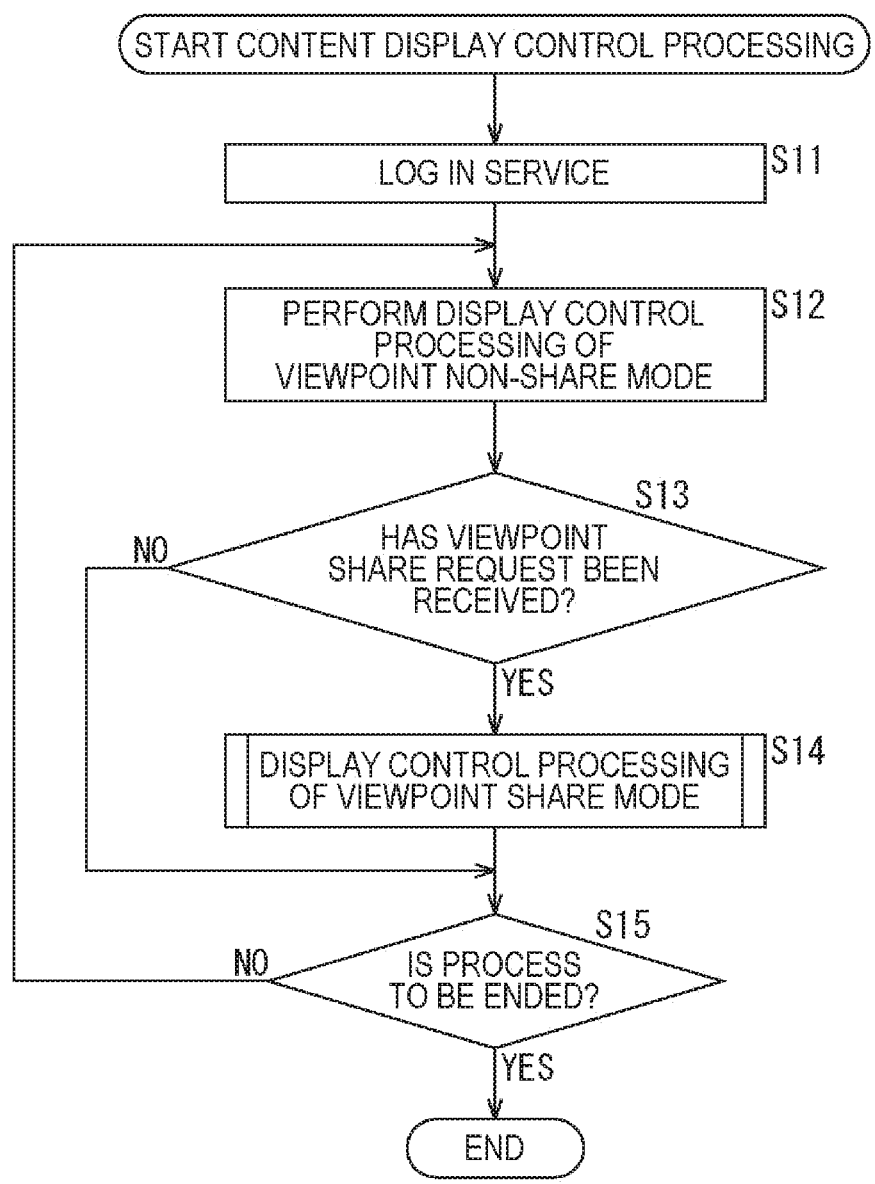
FIG. 15 is a flowchart for explaining display control processing of service content of a model room preview system.

FIG. 15 is a flowchart for explaining display control processing of service content of a model room preview system performed by the HMD11-1.

In step S11, the HMD 11-1 logs in to the service of the model room preview system by transmitting a log-in signal for requesting log-in supplied from the operation input unit 71 to the server 12. The viewpoint position information and the line-of-sight information of the user 1 are supplied from the operation input unit 71 to the visual field image generation processing unit 62-1.

In step S12, display control processing in the viewpoint non-share mode is performed.

In a case of the viewpoint non-share mode, the server 12 transmits a compression ERP image of the user 1 for the user 1 as a compression image stream.

That is, as the display control processing in the viewpoint non-share mode, the compression ERP image decoding unit 61-1 decodes the compression ERP image of the user 1 to generate an ERP image. The visual field image generation processing unit 62-1 generates the visual field image of the user 1, on the basis of the viewpoint position information and the line-of-sight information of the user 1. In a case where of the viewpoint non-share mode, the synthesis processing unit 52 generates the display screen V using the visual field image of the user 1. The display control unit 53 causes the output unit 72 to output the display screen V supplied from the synthesis processing unit 52.

In a case where there is a viewpoint share request of the user 2, the viewpoint share request signal of the user 2 transmitted from the server 12 is supplied to the image processing unit 51-2.

In step S13, the image processing unit 51-2 determines whether or not a viewpoint share request has been received from the server 12. In a case where it is determined in step S13 that a viewpoint share request has been received, the process proceeds to step S14.

In step S14, display control processing in the viewpoint share mode is performed. Details of the display control processing in the viewpoint share mode will be described later with reference to FIG. 16. By processing of step S14, the subscreen W including the visual field image of the user 2 is superimposed on the visual field image of the user 1, the display screen V is generated, and the generated display screen V is output from the output unit 72.

On the other hand, in a case where it is determined in step S13 that the viewpoint share request has not been received, the process proceeds to step S15.

In step S15, the image processing unit 51-1 determines whether or not to end the content display control processing. In a case where it is determined in step S15 that the content display control processing is not to be ended, the process returns to step S12, and the processing in step S12 and subsequent steps is repeated.

In a case where it is determined in step S15 that the content display control processing is to be ended, the content display control processing of FIG. 15 is ended.

Figure 16:
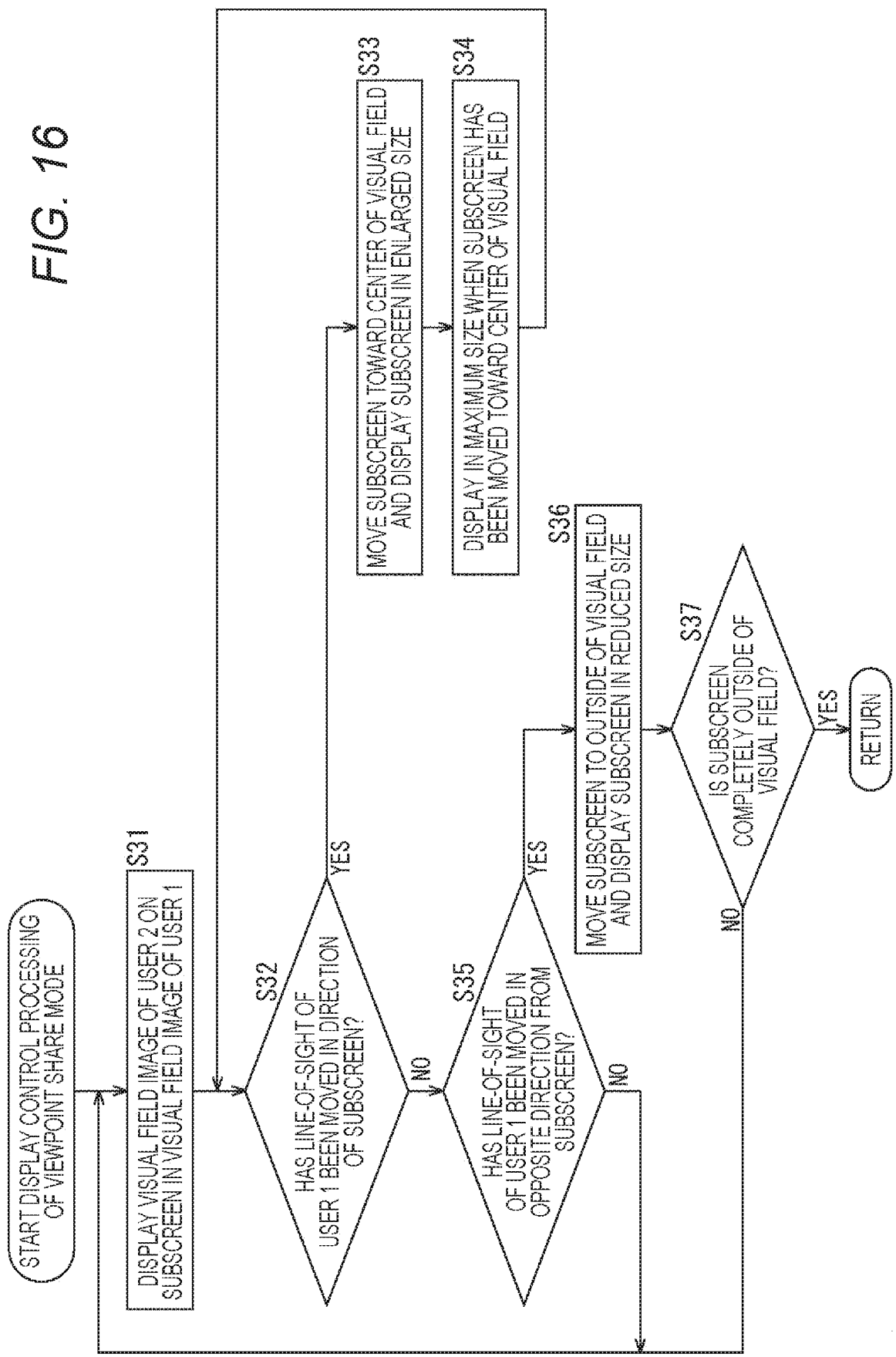
FIG. 16 is a flowchart for explaining display control processing in a viewpoint share mode in step S14 of FIG. 15.

FIG. 16 is a flowchart for explaining display control processing in a viewpoint share mode in step S14 of FIG. 15.

In step S31, the visual field image of the user 2 is displayed in the subscreen within the visual field image of the user 1.

In a case where the viewpoint share request signal is received from the HMD 11-2, the server 12 transmits a multiplexed compressed image stream including the compression ERP image of the user 1 for the user 1 and the compression ERP image of the user 2 for the user 1. Furthermore, the server 12 transmits metadata including the viewpoint share request signal of the user 2, and the viewpoint position information and the line-of-sight information of the user 2.

That is, in the display control processing in the viewpoint share mode, in addition to the display control processing in the viewpoint non-share mode, the compression ERP image decoding unit 61-2 decodes the compression ERP image of the user 2 to generate an ERP image of the user 2. The visual field image generation processing unit 62-2 generates the visual field image of the user 2, on the basis of the viewpoint position information and the line-of-sight information of the user 2.

The synthesis processing unit 52 superimposes the subscreen W including the visual field image of the user 2 on the visual field image of the user 1 on the basis of the viewpoint position information and the line-of-sight information of the user 1 and the viewpoint position information and the line-of-sight information of the user 2 to generate the display screen V. The display control unit 53 causes the output unit 72 to output the display screen V supplied from the synthesis processing unit 52. At this time, the gaze region information of the user 1 is transmitted to the server 12.

In step S32, the synthesis processing unit 52 determines whether or not the user 1 has moved his/her line-of-sight in the direction of the subscreen on the basis of the line-of-sight information of the user 1. In a case where it is determined in step S32 that the user 1 has moved his/her line-of-sight in the direction of the subscreen, the process proceeds to step S33.

In step S33, the synthesis processing unit 52 moves the subscreen toward the center of the visual field of the display screen and displays the subscreen in an enlarged size. At this time, the gaze region information of the user 1 is transmitted to the server 12.

In step S34, when the subscreen moves to the center of the visual field of the display screen, the synthesis processing unit 52 displays the subscreen in the maximum size. At this time, the gaze region information of the user 1 is transmitted to the server 12.

After step S34, the process returns to step S32, and the processing in step S32 and subsequent steps is repeated.

On the other hand, in a case where it is determined in step S32 that the user 1 has not moved his/her line-of-sight in the direction of the subscreen, the process proceeds to step S35.

In step S35, it is determined whether or not the user 1 has moved his/her line-of-sight in the opposite direction from the subscreen on the basis of the line-of-sight information of the user 1. In a case where it is determined in step S35 that the user 1 has not moved his/her line-of-sight in the opposite direction from the subscreen, the process returns to step S31 and the processing in step S31 and subsequent steps is repeated.

In a case where it is determined in step S35 that the user 1 has moved his/her line-of-sight in the opposite direction from the subscreen, the process proceeds to step S36.

In step S36, the synthesis processing unit 52 moves the subscreen toward the outside of the visual field of the display screen and displays the subscreen in a reduced size. At this time, the gaze region information of the user 1 is transmitted to the server 12.

In step S37, the synthesis processing unit 52 determines whether or not the subscreen is completely outside of the visual field of the display screen. In a case where it is determined in step S37 that the subscreen is completely outside of the visual field of the display screen, the display control processing in the viewpoint share mode is ended.

In a case where it is determined in step S37 that the subscreen is not completely outside the user's gaze area information does not completely fall outside of the visual field of the display screen, the gaze region information of the user 1 is transmitted to the server 12, the process returns to step S31, and the processing in Step S31 and subsequent steps is repeated.

Note that the HMD 11-1 has been described as an example, but similar processing is performed in a case of the HMD 11-2.

<Server Operation>

Figure 17:
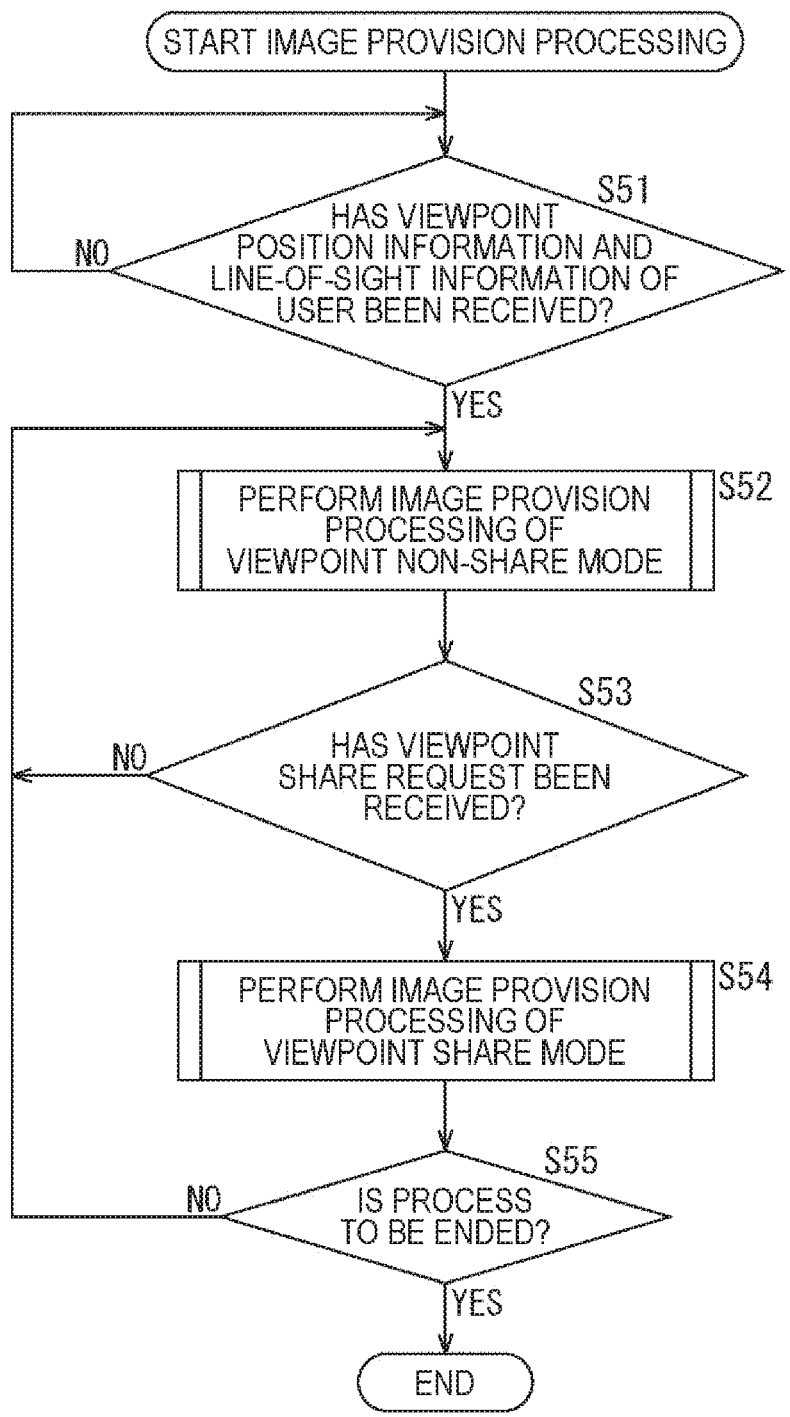
FIG. 17 is a flowchart for explaining image provision processing of a server.

FIG. 17 is a flowchart for explaining image provision processing of the server 12.

In the example of FIG. 17, an example of the viewpoint share request transmitted from the HMD 11-2 of the user 2 is shown, but similar processing is performed in the server 12 also in a case of the HMD 11-1 of the user 1.

In step S51, the viewpoint image generation unit 32-1 and the viewpoint image generation unit 32-2 wait until it is determined that the viewpoint position information and the line-of-sight information of the user have been received. In a case where it is determined in step S51 that the viewpoint position information and the line-of-sight information of the user have been received, the process proceeds to step S52.

In step S52, image generation processing in the viewpoint non-share mode is performed. Details of the image generation processing in the viewpoint non-share mode will be described later with reference to FIG. 18. By the processing of step S52, the compression ERP image of the user 1 is generated, and the generated compression ERP image of the user 1 is transmitted to the HMD 11-1 of the user 1. The compression ERP image of the user 2 is generated, and the generated compression ERP image of the user 2 is transmitted to the HMD 11-2 of the user 2.

In step S53, the viewpoint image generation unit 32-2 determines whether or not the viewpoint share request signal transmitted from the user 2 has been received. In a case where it is determined in step S53 that a viewpoint share request signal transmitted from the user 2 has been received, the process proceeds to step S54.

In step S54, image provision processing in the viewpoint share mode is performed. Details of the image provision processing in the viewpoint share mode will be described later with reference to FIG. 19. By the processing of step S54, the compression ERP image of the user 1 is generated. The compression ERP image of the user 2 is generated, and the generated compression ERP image of the user 2 is transmitted to the HMD 11-2 of the user 2. Furthermore, the compression ERP image of the user 2 is multiplexed with the compression ERP image of the user 1 and transmitted to the HMD 11-1 of the user 1 together with metadata of viewpoint position information, line-of-sight information of the user 2 or the like.

On the other hand, in a case where it is determined in step S53 that a viewpoint share request signal transmitted from the user 2 has not been received, the process returns to step S52 and the processing in step S52 and subsequent steps is repeated.

In step S55, the viewpoint image generation unit 32-1 determines whether or not to end the image generation processing. In a case where it is determined in step S55 that the image generation processing is not to be ended, the process returns to step S52, and the processing in step S52 and subsequent steps is repeated.

In a case where it is determined in step S55 that the image provision process is to be ended, the image provision processing of FIG. 17 is ended.

Figure 18:
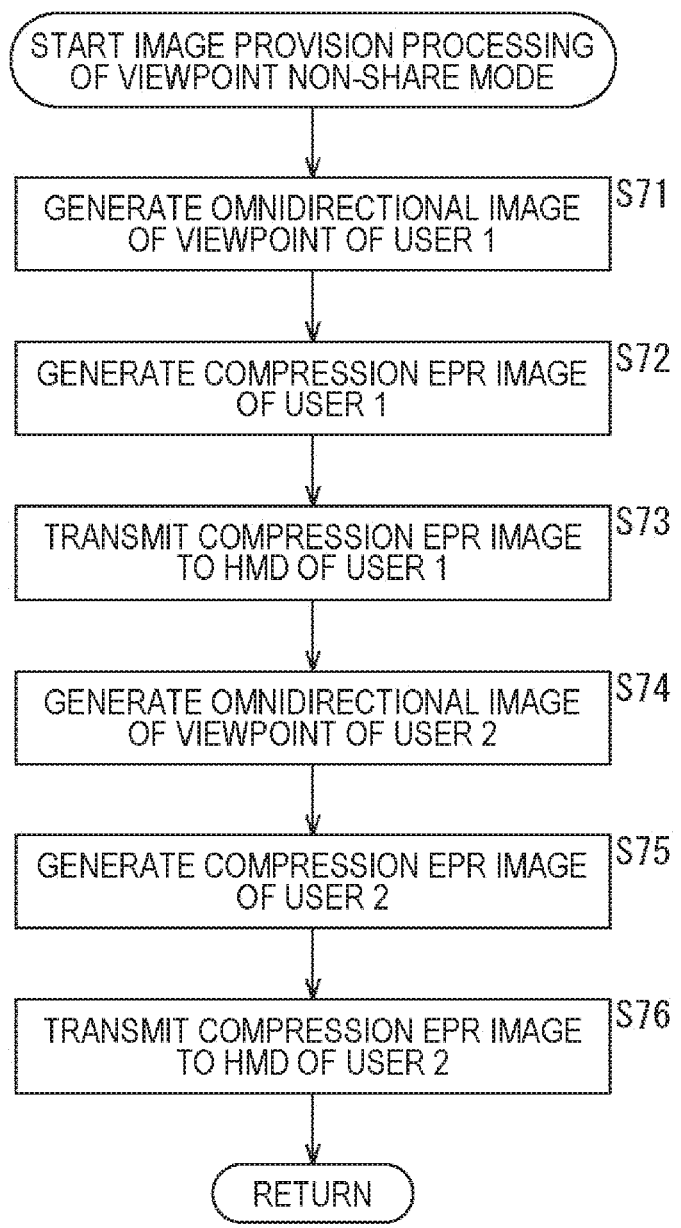
FIG. 18 is a flowchart for explaining image provision processing in a viewpoint non-share mode in step S52 in FIG. 17.

FIG. 18 is a flowchart for explaining image provision processing in a viewpoint non-share mode in step S52 in FIG. 17.

The viewpoint position information and the line-of-sight information of the user 1 transmitted from the HMD 11-1 are supplied to the viewpoint image generation unit 32-1.

In step S71, the viewpoint image generation unit 32-1 uses the omnidirectional image of the free viewpoint image space model DB 31 to generate the omnidirectional image of the viewpoint of the user 1 on the basis of the viewpoint position information and the line-of-sight information of the user 1 supplied from the HMD 11-1.

In step S72, The viewpoint image compression unit 33-1 performs ERP projection conversion to the omnidirectional image of the viewpoint of the user 1 to generate a compression ERP image of the user 1.

In step S73, the multiplexing unit 34 transmits the compression ERP image of the user 1 supplied from the viewpoint image compressing unit 33-1, to the HMD 11-1 of the user 1.

The viewpoint position information and the line-of-sight information of the user 2 transmitted from the HMD 11-2 are supplied to the viewpoint image generation unit 32-2.

In step S74, the viewpoint image generation unit 32-2 uses the omnidirectional image of the free viewpoint image space model DB 31 to generate the omnidirectional image of the viewpoint of the user 2 on the basis of the viewpoint position information and the line-of-sight information of the user 2 supplied from the HMD 11-2.

In step S75, the viewpoint image compression unit 33-3 performs ERP projection conversion to the omnidirectional image of the viewpoint of the user 2 to generate a compression ERP image of the user 2.

In step S76, the viewpoint image compression unit 33-3 transmits the compression ERP image of the user 2 to the HMD 11-2 of the user 2.

Figure 19:
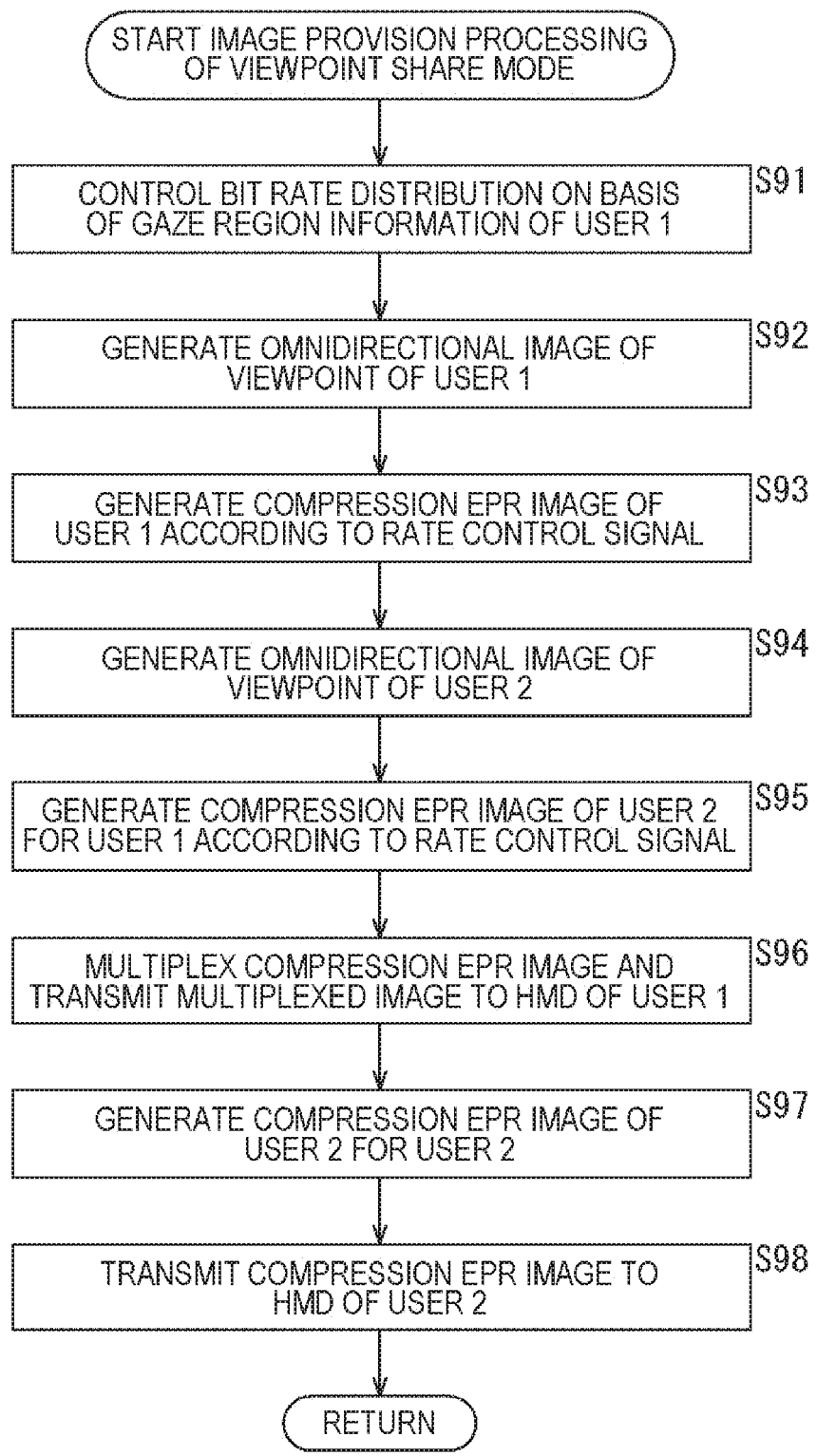
FIG. 19 is a flowchart for explaining image provision processing in a viewpoint share mode in step S54 in FIG. 17.

FIG. 19 is a flowchart for explaining image provision processing in a viewpoint share mode in step S54 in FIG. 17.

The gaze region information of the user 1 transmitted from the HMD 11-1 is supplied to the rate distribution control unit 35.

In step S91, the rate distribution control unit 35 controls the bit rate distribution of the omnidirectional image of the viewpoint of the user 1 and the omnidirectional image of the viewpoint of the user 2 on the basis of the gaze region information of the user 1 supplied from the HMD 11-1.

In step S92, the viewpoint image generation unit 32-1 uses the omnidirectional image of the free viewpoint image space model DB 31 to generate the omnidirectional image of the viewpoint of the user 1 on the basis of the viewpoint position information and the line-of-sight information of the user 1 supplied from the HMD 11-1.

In step S93, the viewpoint image compression unit 33-1 performs ERP projection conversion of the omnidirectional image of the viewpoint of the user 1 according to the rate control signal supplied from the rate distribution control unit 35 to generate a compression ERP image of the user 1.

In step S94, the viewpoint image generation unit 32-2 uses the omnidirectional image of the free viewpoint image space model DB 31 to generate the omnidirectional image of the viewpoint of the user 2 on the basis of the viewpoint position information and the line-of-sight information of the user 2 supplied from the HMD 11-2.

In step S95, the viewpoint image compression unit 33-2 performs ERP projection conversion of the omnidirectional image of the viewpoint of the user 2 according to the rate control signal supplied from the rate distribution control unit 35 to generate a compression ERP image of the user 2 for the user 1.

In step S96, the multiplexing unit 34 multiplexes the compression ERP image of the user 1 supplied from the viewpoint image compression unit 33-1, and the compression ERP image of the user 2 supplied from the viewpoint image compression unit 33-2 to generate a compression image stream, and transmits the result to the user 1.

In step S97, the viewpoint image compression unit 33-3 performs ERP projection conversion to the omnidirectional image of the viewpoint of the user 2 to generate a compression ERP image of the user 2 for the user 2.

In step S98, the viewpoint image compression unit 33-3 transmits the compression ERP image of the user 2 to the HMD 11-2 of the user 2.

As described above, in the present technology, display of the visual field image of another user that is superimposed on the visual field image of the user is controlled on the basis of the positional relationship in the virtual space.

Therefore, the position where the another user is present and the content of the visual field image of the another user are simultaneously known, so that if the user is interested in the image of the another user, the user can easily move by operating a remote controller or the like.

Furthermore, the bit rates for the user image and the another user image are distributed to according to the line-of-sight information for the visual field image of the another user, so that the transmission efficiency is improved.

Moreover, according to the line-of-sight information for the visual field image of the another user, the visual field image of the counterpart is selected (or canceled), and the size of the subscreen is changed.

Therefore, an image of another user can be displayed according to the presence or absence of interest.

Second Embodiment

<Another Example of Display Method of Subscreen>

Next, another example of a display method of a subscreen in the viewpoint share mode in the model room preview system will be described.

FIG. 20 is a diagram showing an example of transition of the display screen in a case where the viewpoint of user 1 and the viewpoint of user 2 are the same.

Figure 20A:
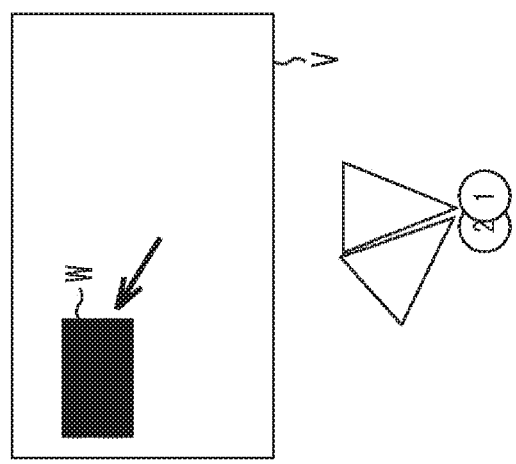
FIGS. 20A, 20B, and 20C are diagrams showing an example of transition of the display screen of the subscreen in a case where the viewpoint of the user 1 and the viewpoint of the user 2 are the same.
Figure 20B:
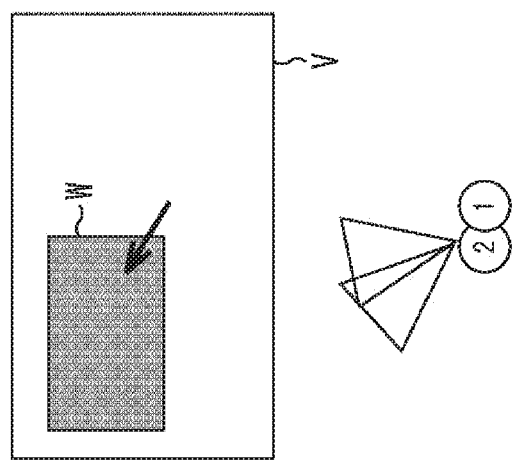
Figure 20C:
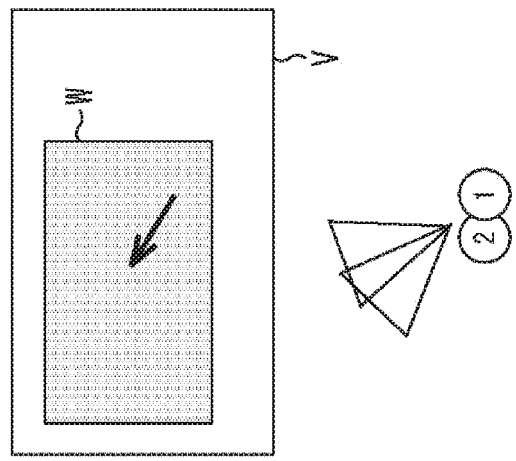

FIGS. 20A, 20B, and 20C are diagrams showing an example of transition of the display screen in a case where the viewpoint of user 1 and the viewpoint of user 2 are the same.

FIGS. 20A, 20B, and 20C shows a transition of the display state on the display screen V in a case where the viewpoint of the user 1 and the viewpoint of the user 2 are the same. The lower the density of the subscreen W displayed on the display screen V, the higher the transmittance. The arrow shown on the display screen V indicates the line-of-sight direction of the user 1. Below the transition of the display state, a state in which the free viewpoint image space in which the user 1 and the user 2 exist is viewed from directly above.

FIG. 20A is a diagram showing the display screen V in which the visual field image of user 2 is displayed as the subscreen W in the visual field image being viewed by user 1 when the visual field of the user 1 and the visual field of the user 2 do not overlap in the free viewpoint image space.

The position of the subscreen W in the visual field image of the user 1 matches the line-of-sight direction of the user 2 in the free viewpoint image space.

FIG. 20B is a diagram showing the display screen V when the visual fields of the user 1 and the user 2 overlap with each other in the free viewpoint image space due to the user 1 wearing the HMD turning his/her face to the subscreen W.

On the display screen V, a sub-screen in a semi-transmissive transmissive state in which the size is enlarged according to the overlapping ratio of the visual fields is displayed. Note that in a case where the movement is detected by a smartphone, the operation of changing the direction while holding the smartphone in the hand corresponds to the operation of turning the face to the subscreen W in a case of the HMD.

For the overlapping ratio of the visual fields, the negative direction is also considered. The negative indicates a case where there is no overlap between the visual fields of the users and there is a large gap in the line-of-sight direction.

FIG. 20C is a diagram showing the display screen V when the overlapping ratio of the visual fields of the user 1 and the user 2 in the free viewpoint image space increases.

Figure 21B:
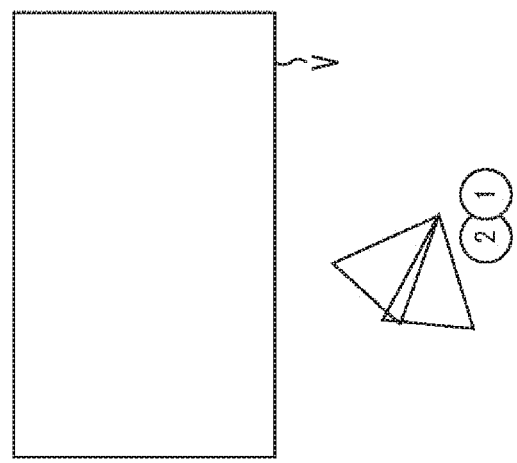
FIGS. 21A and 21B are diagrams, following FIGS. 20A, 20B, and 20C, showing an example of transition of the display screen in a case where the viewpoint of the user 1 and the viewpoint of the user 2 are the same.
Figure 21A:
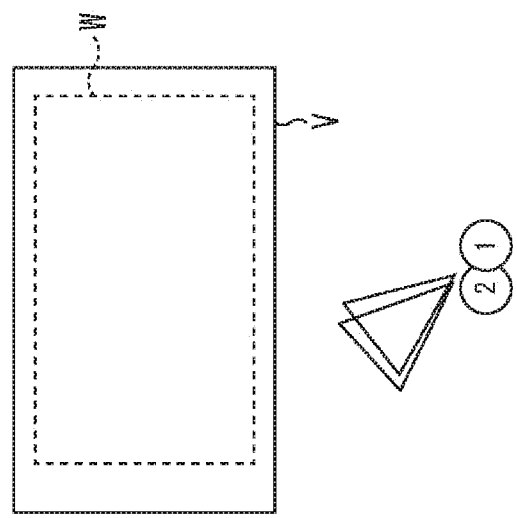

On the display screen V, a subscreen W is displayed in which the enlarged ratio and the transmittance are further increased compared to the case of FIG. 20B FIGS. 21A and 21B are diagrams, following FIGS. 20A, 20B, and 20C, showing an example of transition of the display screen in a case where the viewpoint of the user 1 and the viewpoint of user 2 are the same.

FIG. 21A is a diagram showing the display screen V when the overlapping ratio of the visual fields of the user 1 and the user 2 in the free viewpoint image space exceeds a certain threshold.

On the display screen V, only the visual field image of the user 1 is displayed after the display of the subscreen W is disappeared when the overlapping ratio of the visual fields exceeds a certain threshold.

FIG. 21B is a diagram showing the display screen V until the overlapping ratio of the visual fields of the user 1 and the user 2 that has exceeded a certain threshold once again falls equal or lower than the certain threshold in a case of exceeding a certain threshold.

On the display screen V, the state where the display of the subscreen W is and only the visual field image of the user 1 is displayed continues.

Thereafter, when the overlapping ratio of the visual fields of the user 1 and the user 2 in the free viewpoint image space becomes equal to or less than the certain threshold value, the subscreen display is started again, as in the display screen V shown in FIG. 20A.

FIGS. 22A and 22B are diagrams showing an example of transition of the display screen of in a case where the viewpoint of user 1 and the viewpoint of user 2 are different from each other.

FIGS. 22A and 22B show a transition of the display state on the display screen V in a case where the viewpoint of the user 1 and the viewpoint of the user 2 are different from each other in the free viewpoint image space. The arrow shown on the display screen V indicates the line-of-sight direction of the user 1. Below the transition of the display state, a state in which the free viewpoint image space in which the user 1 and the user 2 exist is viewed from directly above.

FIG. 22A is a diagram showing the display screen V in a state where the visual field image of the user 2 is displayed as the subscreen W in the visual field image being viewed by the user 1.

The position of the subscreen W in the visual field image of the user 1 matches the viewpoint direction of the user 2 viewed by the user 1 in the free viewpoint image space.

FIG. 22B shows the display screen V when the user 1 wearing the HMD in the free viewpoint image space faces the direction of the viewpoint of the user 2, that is, when the face of the user 1 is turned to the subscreen W.

On the display screen V, the subscreen W moved to the center of the visual field of the user 1 is displayed.

Figure 23B:
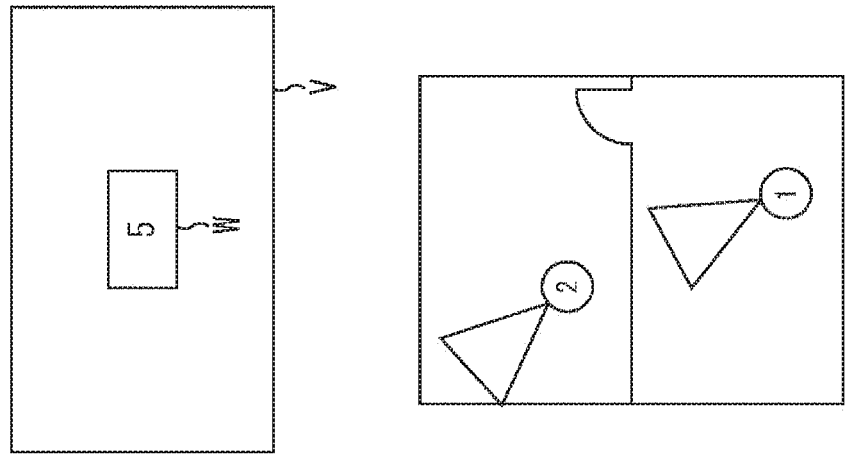
FIGS. 23A and 23B are diagrams, following FIGS. 22A and 22B, showing an example of transition of the display screen in a case where the viewpoint of the user 1 and the viewpoint of the user 2 are different from each other.
Figure 23A:
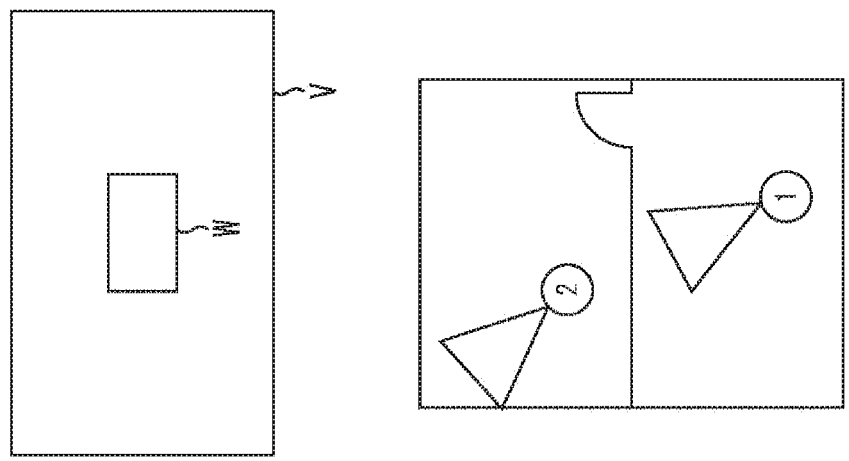

FIGS. 23A and 23B are diagrams, following FIGS. 22A and 22B, showing an example of transition of the display screen in a case where the viewpoint of user 1 and the viewpoint of user 2 are different from each other.

FIG. 23A is a diagram showing the display screen V when the viewpoint of the user 2 is positioned in the line-of-sight direction of the user 1 in the free viewpoint image space.

On the display screen V, the subscreen W in the center of the visual field of the user 1 is displayed.

FIG. 23B is a diagram showing the display screen V when a static state is maintained for N seconds in a state where the viewpoint of the user 2 is positioned in the line-of-sight direction of the user 1 in the free viewpoint image space, that is, in a state where the subscreen W is positioned at the center of the visual field of the user 1.

On the display screen, a countdown timer (numeral "5") is displayed on the subscreen W.

FIGS. 24A and 24B are diagrams, following FIGS. 23A and 23B, showing an example of transition of the display screen in a case where the viewpoint of user 1 and the viewpoint of user 2 are different from each other.

FIG. 24A is a diagram showing the display screen V immediately before the countdown timer becomes "0" and the viewpoint of the user 1 moves to the viewpoint of the user 2 as indicated by an arrow.

On the display screen V, a countdown timer (numeral "0") is displayed on the subscreen W.

FIG. 24B is a diagram showing the display screen V in a state immediately after the viewpoint of the user 1 has moved to the viewpoint of the user 2.

On the display screen V, as indicated by the dotted line, the display of the subscreen W is ended and the viewpoint image of the user 1 after moving is displayed. The viewpoint image of the user 1 displayed on the display screen V is the same viewpoint image as the viewpoint image of the user 2.

Note that the movement of the viewpoint may be an instantaneous movement (jump) or, for example, a continuous movement by an operation of a remote controller.

Figure 25B:
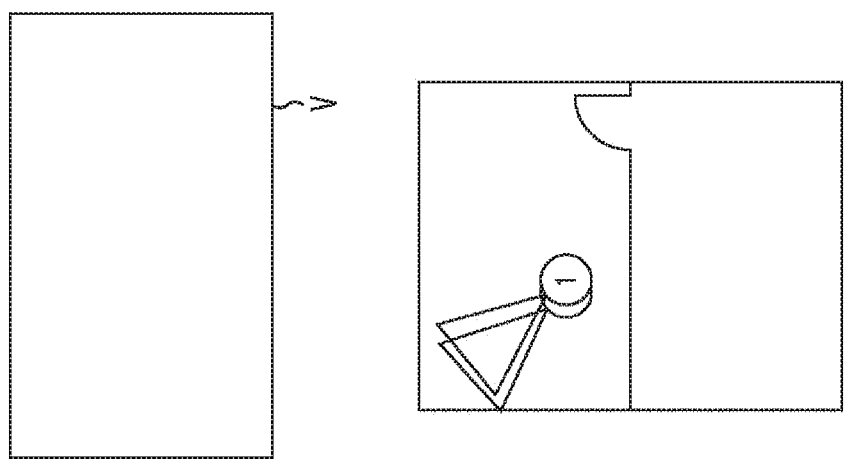
FIGS. 25A and 25B are diagrams, following FIGS. 24A and 24B, showing an example of transition of the display screen in a case where the viewpoint of the user 1 and the viewpoint of the user 2 are different from each other.
Figure 25A:
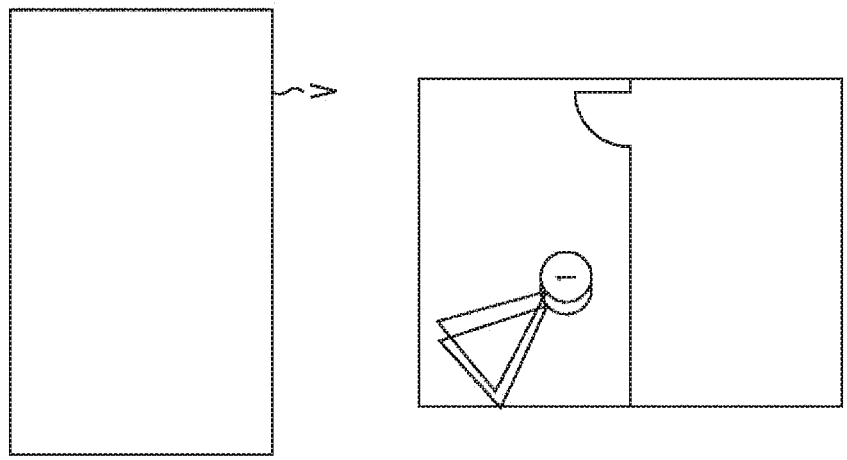

FIGS. 25A and 25B are diagrams, following FIGS. 24A and 24B, showing an example of transition of the display screen in a case where the viewpoint of user 1 and the viewpoint of user 2 are different from each other.

FIG. 25A shows the display screen V when the viewpoint of the user 1 is at the same position as the viewpoint of the user 2, and then the line-of-sight of the user 1 is further moved in a direction coinciding with the line-of-sight of the user 2.

FIG. 25B is a diagram showing the display screen V when the viewpoints and lines-of-sight of the user 1 and the user 2 match.

The display screen V has transitioned to the same state as the state where the user 1 and the user 2 described above with reference to FIGS. 21A and 21B are at the same viewpoint position (state FIG. 21A).

FIGS. 26A, 26B, and 26C is a diagram, following FIGS. 25A and 25B, showing an example of transition of the display screen in a case where the viewpoint of user 1 and the viewpoint of user 2 are different from each other.

FIG. 26A is a diagram showing the display screen V when counting is performed with the countdown timer in a state where the viewpoint of the user 2 is positioned in the line-of-sight direction of the user 1 in the free viewpoint image space.

The display screen shows that the countdown timer is "1" in a state where the subscreen W is positioned at the center of the visual field of the user 1.

FIG. 26B is a diagram showing the display screen V in a state where the user 1 displaces his/her line-of-sight away from the position where the viewpoint of the user 2 is positioned before the countdown timer reaches 0.

On the display screen V, the subscreen W in a state of being moved in a direction being off the center of the visual field of the user 1 is displayed.

FIG. 26C shows the display screen V when the displacement of the line-of-sight exceeds a certain threshold after the state of B-of-FIG. 26B.

On the display screen V, the display of the subscreen W has been ended, and only the visual field image of the user 1 is displayed.

Figure 27B:
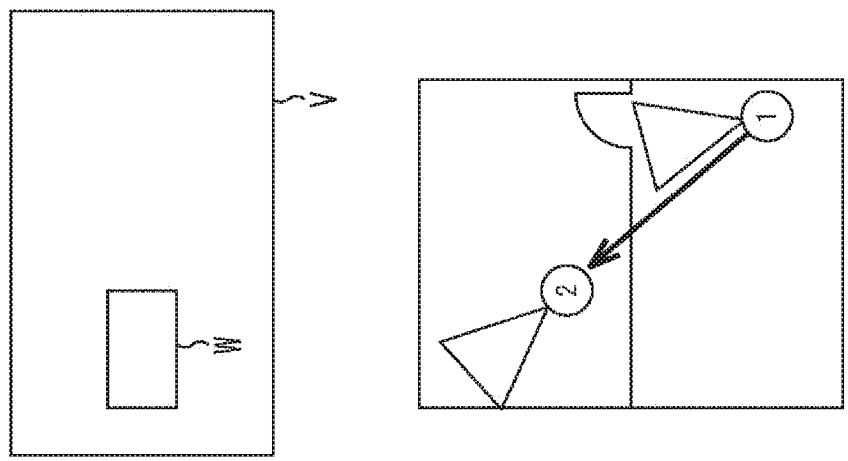
FIGS. 27A and 27B is a diagram, following FIGS. 26A, 26B, and 26C, showing an example of transition of the display screen in a case where the viewpoint of the user 1 and the viewpoint of the user 2 are different from each other.
Figure 27A:
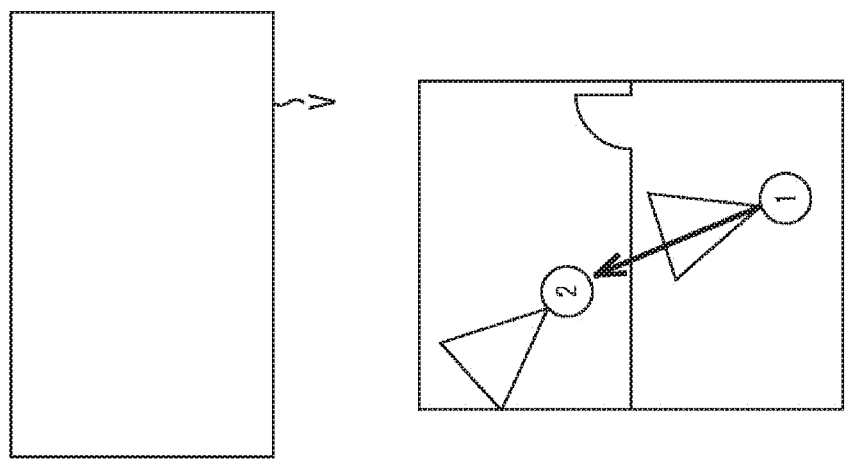

FIGS. 27A and 27B are diagrams, following FIGS. 26A, 26B, and 26C, showing an example of transition of the display screen in a case where the viewpoint of user 1 and the viewpoint of user 2 are different from each other. In FIGS. 27A and 27B, the arrow in the free viewpoint image space indicates the direction vector of the viewpoint of user 2 as viewed from user 1.

FIG. 27A shows the display screen V when the viewpoint of the user 1 moves to the viewpoint of user 2 in the free viewpoint image space, and the direction vector of the viewpoint of the user 2 as viewed from the user 1 changes.

On the display screen V, the subscreen W is not displayed until the direction vector of the viewpoint of the user 2 as viewed from the user 1 becomes equal to or larger than a certain threshold.

FIG. 27B is a diagram showing the display screen V when the viewpoint of the user 1 or the user 2 moves, and the direction vector of the viewpoint of the user 2 as viewed from the user 1 changes and becomes equal to or larger than a certain threshold.

On the display screen V, the subscreen W is displayed again.

As described above, it is possible to move the line-of-sight and the viewpoint during the viewpoint share mode.

<Hmd Operation>

Figure 28:
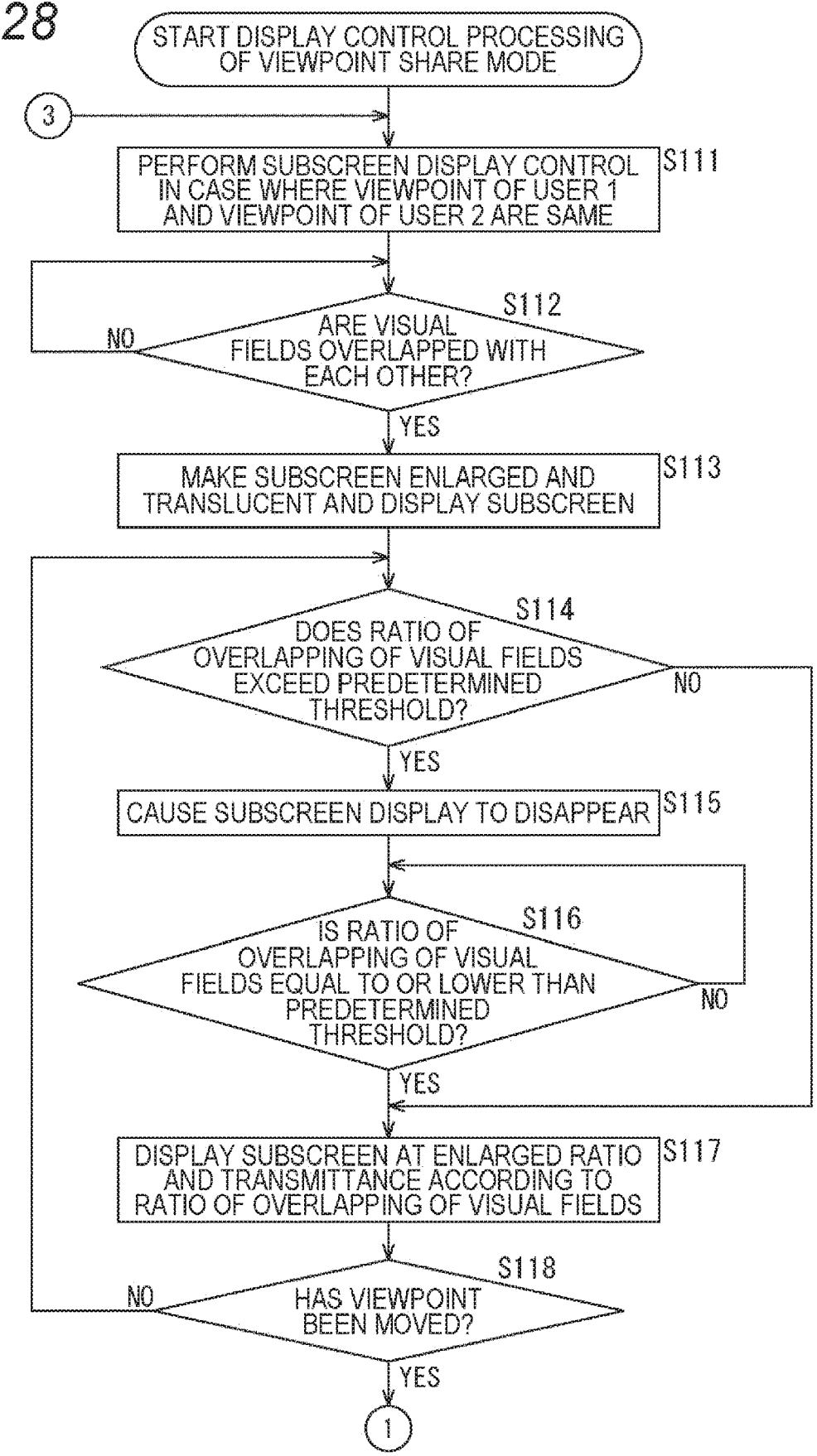
FIG. 28 is a flowchart for explaining display control processing in the viewpoint share mode described above with reference to FIGS. 21A, 21B, 22A, 22B, 23A, 23B, 24A, 24B, 25A, 25B, 26A, 26B, 26C, 27A, and 27B.

FIG. 28 is a flowchart for explaining display control processing in the viewpoint share mode described above with reference to FIGS. 20A, 20B, 20C, 21A, 21B, 22A, 22B, 23A, 23B, 24A, 24B, 25A, 25B, 26A, 26B, 26C, 27A, and 27B.

Note that the display control processing in the viewpoint share mode will be described with reference to the transition diagrams of FIGS. 20A, 20B, 20C, 21A, 21B, 22A, 22B, 23A, 23B, 24A, 24B, 25A, 25B, 26A, 26B, 26C, 27A, and 27B as appropriate.

Figure 29:
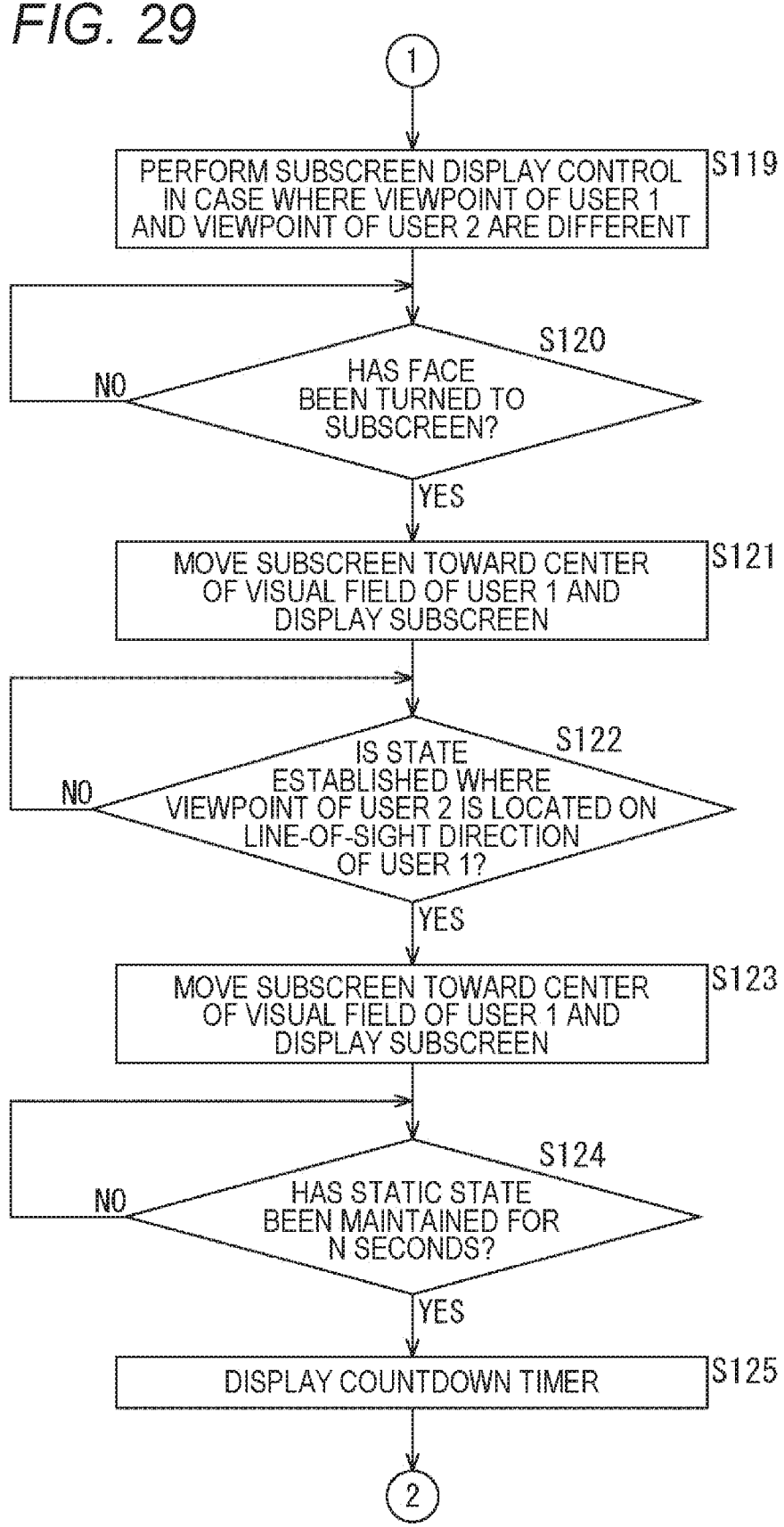
FIG. 29 is a flowchart, following FIG. 28, for explaining display control processing in a viewpoint share mode.

Furthermore, the display control processing in the viewpoint share mode is started from step S111 in FIG. 28 in a case where the viewpoint of the user 1 and the viewpoint of the user 2 are the same, but in a case where the viewpoint of the user 1 and the viewpoint of the user 2 are different from each other, the processing is started from step S119 in FIG. 29.

In step S111, the visual field image of user 2 in a case where the viewpoint of the user 1 and the viewpoint of the user 2 are the same is displayed on the subscreen in the visual field image of the user 1 (see FIG. 20A).

In step S112, the synthesis processing unit 52 waits until it is determined that the viewpoints of the user 1 and the user 2 overlap with each other on the basis of the viewpoint position information and the line-of-sight information of the user 1 and the viewpoint position information and the line-of-sight information of the user 2.

In a case where it is determined in step S112 that the visual fields of the user 1 and the user 2 overlap with each other, the process proceeds to step S113.

In step S113, the synthesis processing unit 52 makes the subscreen enlarged and translucent, and displays the display screen (see FIG. 20B).

In step S114, the synthesis processing unit 52 determines whether or not the overlapping ratio of the visual fields has exceeded a predetermined threshold.

In a case where it is determined in step S114 that the overlapping ratio of the visual fields has exceeded the predetermined threshold, the process proceeds to step S115.

In step S115, the synthesis processing unit 52 causes the subscreen display to disappear (see FIG. 21A).

In step S116, the synthesis processing unit 52 waits until it is determined that the overlapping ratio of the visual fields is equal to or smaller than the predetermined threshold.

In a case where it is determined in step S116 that the overlapping ratio of the visual fields is equal to or smaller than the predetermined threshold, the process proceeds to step S117.

On the other hand, in a case where it is determined in step S114 that the overlapping ratio of the visual fields does not exceed the predetermined threshold, the process proceeds to step S117.

In step S117, the synthesis processing unit 52 displays the subscreen at an enlargement ratio and a transmittance according to the overlapping ratio of the visual fields (see FIG. 20B).

In step S118, the synthesis processing unit 52 determines whether or not the viewpoint of the user 1 has been moved.

In a case where it is determined in step S118 that the viewpoint has not been moved, the process returns to step S114, and the processing in step S114 and subsequent steps is repeated.

In a case where it is determined in step S118 that the viewpoint has been moved, the process proceeds to step S119 in FIG. 29.

In step S119, the visual field image of user 2 in a case where the viewpoint of user 1 and the viewpoint of the user 2 are different from each other is displayed on the subscreen in the visual field image of the user 1 (see FIG. 22A).

In step S120, the synthesis processing unit 52 waits until it is determined that the user 1 turns his/her face to the subscreen on the basis of the viewpoint position information and the line-of-sight information of the user 1 and the viewpoint position information and the line-of-sight information of the user 2.

In step S121, the synthesis processing unit 52 moves the subscreen toward the center of the visual field of the user 1 for display (see FIG. 22B).

In step S122, the synthesis processing unit 52 waits until it is determined that the viewpoint of the user 2 is positioned in the line-of-sight direction of the user 1.

In a case where it is determined in step S122 that the viewpoint of the user 2 is positioned in the line-of-sight direction of the user 1 (the center portion of the display screen V) in the free viewpoint image space, the process proceeds to step S123.

In step S123, the synthesis processing unit 52 moves the subscreen toward the center of the visual field of the user 1 for display (see FIG. 23A).

In step S124, the synthesis processing unit 52 waits until it is determined that a static state has been maintained for N seconds after the subscreen is moved to the center of the visual field of the user 1.

In a case where it is determined in step S124 that a static state has been maintained for N seconds after the subscreen is moved to the center of the visual field of the user 1, the process proceeds to step S125.

In step S125, the synthesis processing unit 52 displays the countdown timer on the subscreen (see FIG. 23B).

Figure 30:
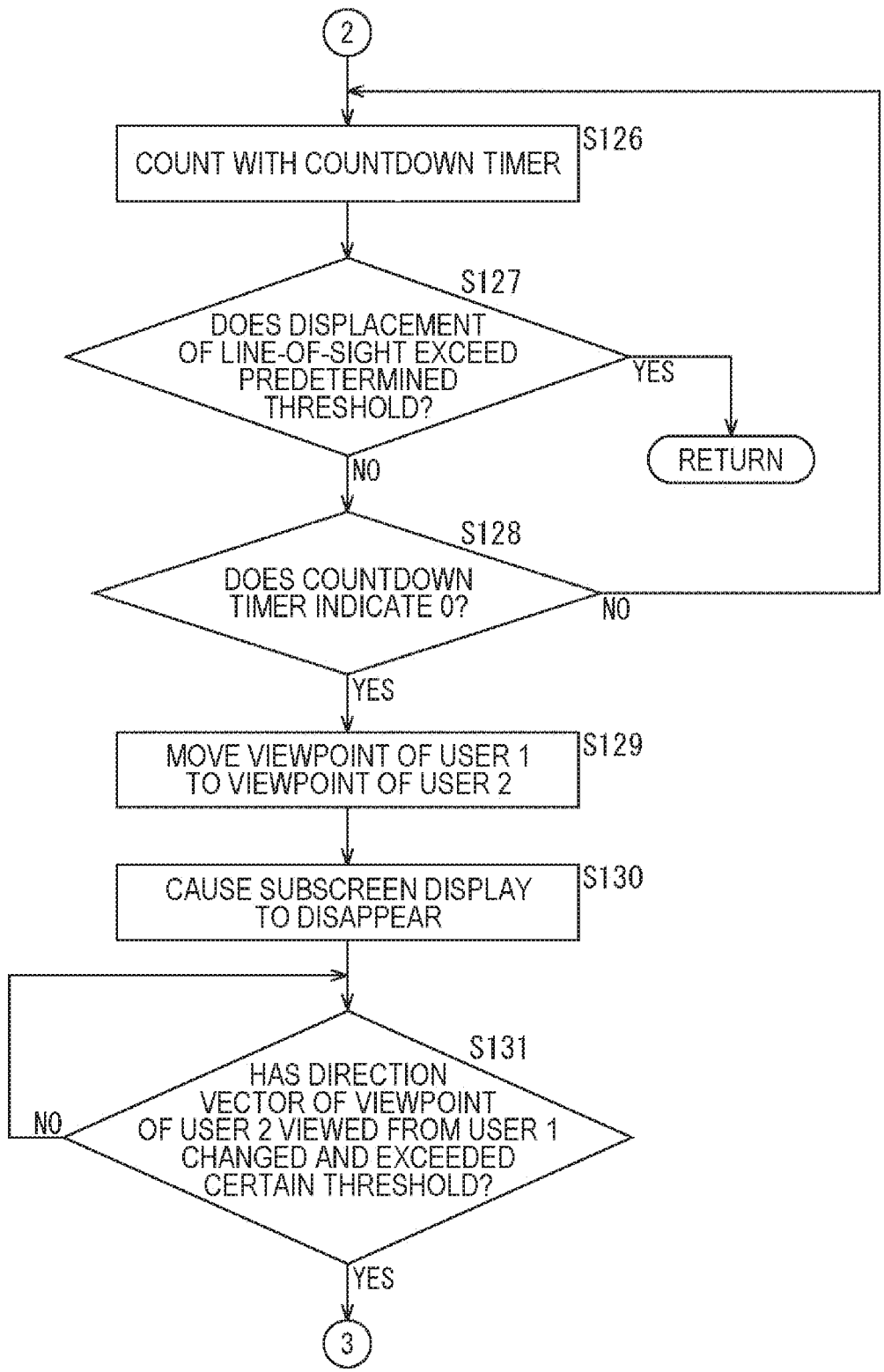
FIG. 30 is a flowchart, following FIG. 29, for explaining display control processing in a viewpoint share mode.

In step S126 in FIG. 30, the synthesis processing unit 52 counts with the countdown timer using a built-in counter (not shown).

In step S127, the synthesis processing unit 52 determines whether or not the displacement of the line-of-sight of the user 1 has exceeded a predetermined threshold.

In a case where it is determined in step S127 that the displacement of the line-of-sight of the user 1 has exceeded the predetermined threshold, the display control processing in the viewpoint share mode is ended. That is, display control processing in the viewpoint non-share mode is performed.

In a case where it is determined in step S127 that the displacement of the line-of-sight of the user 1 has not exceeded the predetermined threshold, the process proceeds to step S128.

In step S128, the synthesis processing unit 52 determines whether or not the countdown timer indicates 0.

In a case where it is determined in step S128 that the countdown timer does not indicate 0, the process returns to step S126, and the processing in step S126 and subsequent steps is repeated.

In a case where it is determined in step S128 that the countdown timer indicates 0, the process proceeds to step S129.

In step S129, the synthesis processing unit 52 moves the viewpoint of the user 1 to the viewpoint of the user 2 (see FIG. 24B). The movement of the viewpoint to another user may be performed by jumping the viewpoint. At this time, the viewpoint position information and the line-of-sight information of the user 1 of which viewpoint has been moved are transmitted to the server 12.

In step S130, the synthesis processing unit 52 causes the display of the subscreen to disappear. That is, the visual field image of the user 1 and the visual field image of the user 2 are the same.

In step S131, the synthesis processing unit 52 waits until it is determined that the direction vector of the viewpoint of the user 2 as viewed from the user 1 has changed and has exceeded a certain threshold.

In a case where it is determined in step S131 that the direction vector of the viewpoint of user 2 as viewed from user 1 has changed and has exceeded a certain threshold, the process returns to step S111 in FIG. 28, and display control processing in a case where the viewpoint of the user 1 and the viewpoint of the user 2 are the same is repeatedly performed.

As described above, according to the present technology, at the time of superimposition, the transmittance is changed in addition to the size of the subscreen. Therefore, a visual effect can be achieved in which, as the two visual fields match, the subscreen becomes larger and the transmittance increases, and the two visual fields finally match with each other. Note that it is also possible to change only the transmittance without changing the size.

The viewpoint is moved by fixing the user's line-of-sight to the viewpoint of another user displayed on the subscreen for a certain period of time, so that the operation can be easily performed without the need for button operation or the like.

The countdown timer is displayed at the time of moving the viewpoint, so that a grace period is provided before the operation is performed. In addition, the viewpoint movement is canceled by the movement of the line-of-sight due to, for example, the head swinging of the HMD during the grace period, so that the operation can be easily canceled without the need for button operation or the like. Note that the timer may be a count-up timer.

Since the on/off of the display of the subscreen is controlled by using the coincidence ratio of the line-of-sight directions or the direction vector of the viewpoint (relative positional relationship) as a trigger, the display can be easily controlled without the need for button operation or the like.

In the description described above, an example of a model room preview system used in the real estate business has been described, but the present technology can also be applied to social virtual reality (VR) such as communication is performed using an avatar in a virtual space.

Third Embodiment

<Overview of VR Sightseeing Tour>

An example of the social VR is a VR sightseeing tour in a group including a tour guide and a plurality of tour visitors, who can view each other as avatars in a VR space.

There are other avatars besides the tour visitors, one avatar may be another individual traveler, and another avatar may be an AI. A tour guide may also be an AI.

Because of the VR space, instantaneous movement is freely possible, and tour visitors can also walk around and ride vehicles like real space as avatars.

First, a plurality of tour visitors tours the VR space according to the instructions of the avatar of the tour guide.

At free time, a tour visitor X wants another tour visitor to view the scene he/she is viewing, and shifts to a viewpoint share mode by a viewpoint share request. The visual field image of the tour visitor X is displayed in the subscreen within the visual field of the another tour visitor. At this time, the tour visitor X can explain the scene he/she is viewing by using a voice message or a text message.

From the display position of the subscreen and the display contents, the another tour visitors can move to the point presented by the tour visitor X while walking in the VR space and viewing the scenery. Furthermore, the another tour visitor can instantaneously move to a point presented by the tour visitor X using a jump from the viewpoint.

In a case where the another visitor views the contents of the subscreen and found that the another visitor has already viewed the contents in the past, instead of not moving this time, the tour visitor X can send a message of "Wonderful" or "You can see XX if you go further from there", for example.

Furthermore, since it is the time for the gathering for moving to the next destination, the tour guide provides guidance to all the tour visitors at the central square, which is the gathering point, for the gathering.

An image of the central square, which is the guide's visual field image, is displayed on the subscreen within the visual field of all tour visitors. At the same time as the subscreen display, the tour guide provides notification of the meeting time by voice message or text message.

The position of the subscreen is determined in the relative positional relationship between the tour visitor and the tour guide in the VR space.

From the display position of the subscreen and display contents, the tour visitor can know that the gathering point is near him/her, and can move to the gathering point while walking in the VR space and enjoying the scenery.

In a case where the tour visitor is quite far from the gathering point or does not need to go sightseeing further, he/she can use the jump of the viewpoint to move instantly to the central square where the tour guide is located.

Note that, in a case where the user wants to know the distance to the moving place, the distance may be displayed as character information. Not only the direction and the distance but also a map in a bird's-eye view state may be displayed.

As described above, the present technology can also be applied to social VR.

Note that the above-described HMDs 11-1 and 11-2 are collectively referred to as HMD 11. The HMD 11 is achieved by the following hardware.

<Example of HMD Hardware Configuration>

Figure 31:
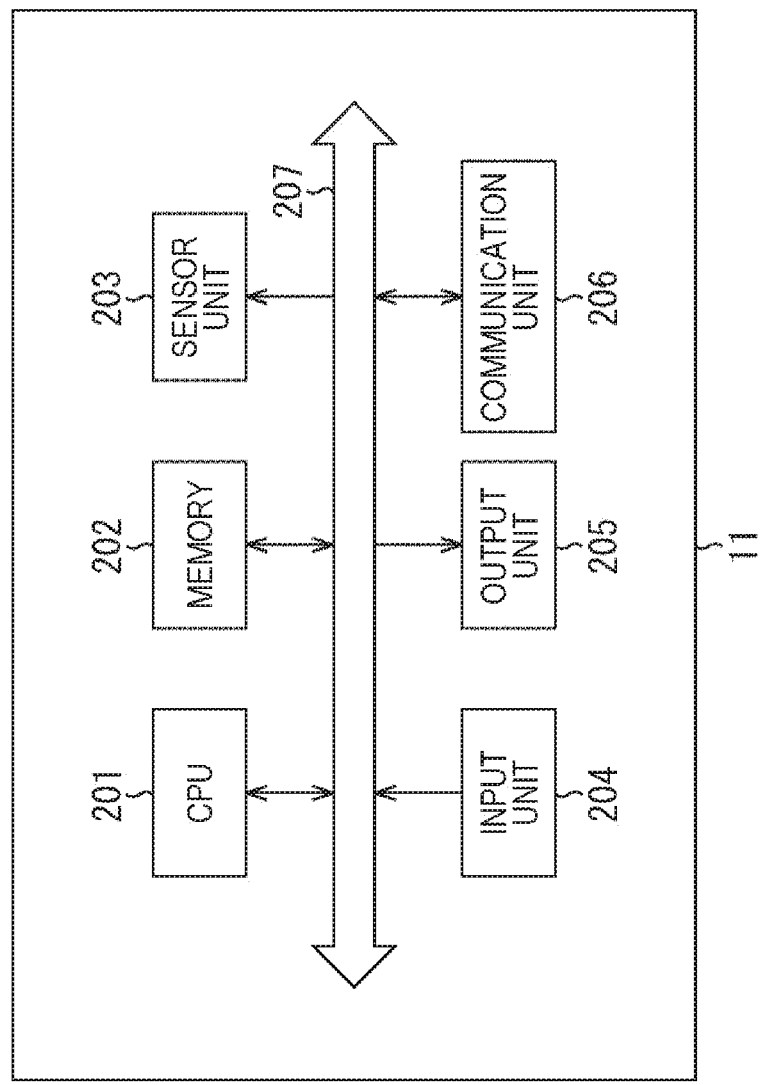
FIG. 31 is a block diagram showing a hardware configuration example of the HMD.

FIG. 31 is a block diagram showing a hardware configuration example of the HMD.

The HMD 11 in FIG. 31 includes a central processor unit (CPU) 201, a memory 202, a sensor unit 203, an input unit 204, an output unit 205, and a communication unit 206. These are interconnected via a bus 207.

The CPU 201 executes processing for achieving various functions of the HMD 11 according to programs, data, and the like stored in the memory 202.

The memory 202 includes a storage medium such as a semiconductor memory or a hard disk, and stores programs and data for processing by the CPU 201.

The sensor unit 203 includes various sensors such as a camera, a microphone, a gyro sensor, and an acceleration sensor. Various types of sensor information acquired by the sensor unit 203 are also used for processing by the CPU 201.

The input unit 204 includes buttons, keys, a touch panel, and the like.

Operation information from the sensor unit 203 and the input unit 204 is supplied to the operation input unit 71 in FIG. 5, and is supplied to the visual field image generation processing unit 62-1 and the like.

The output unit 205 includes the output unit 72 of FIG. 5, a speaker, and the like. The communication unit 206 is configured as a communication interface that mediates various types of communication with the server 12 and the like.

<Configuration Example of Server Hardware>

The series of processing of the server described above can be also executed by hardware or can be executed by software. In a case of executing a series of processing by software, a program included in the software is installed to a computer incorporated in dedicated hardware, a general personal computer, or the like from a program recording medium.

Figure 32:
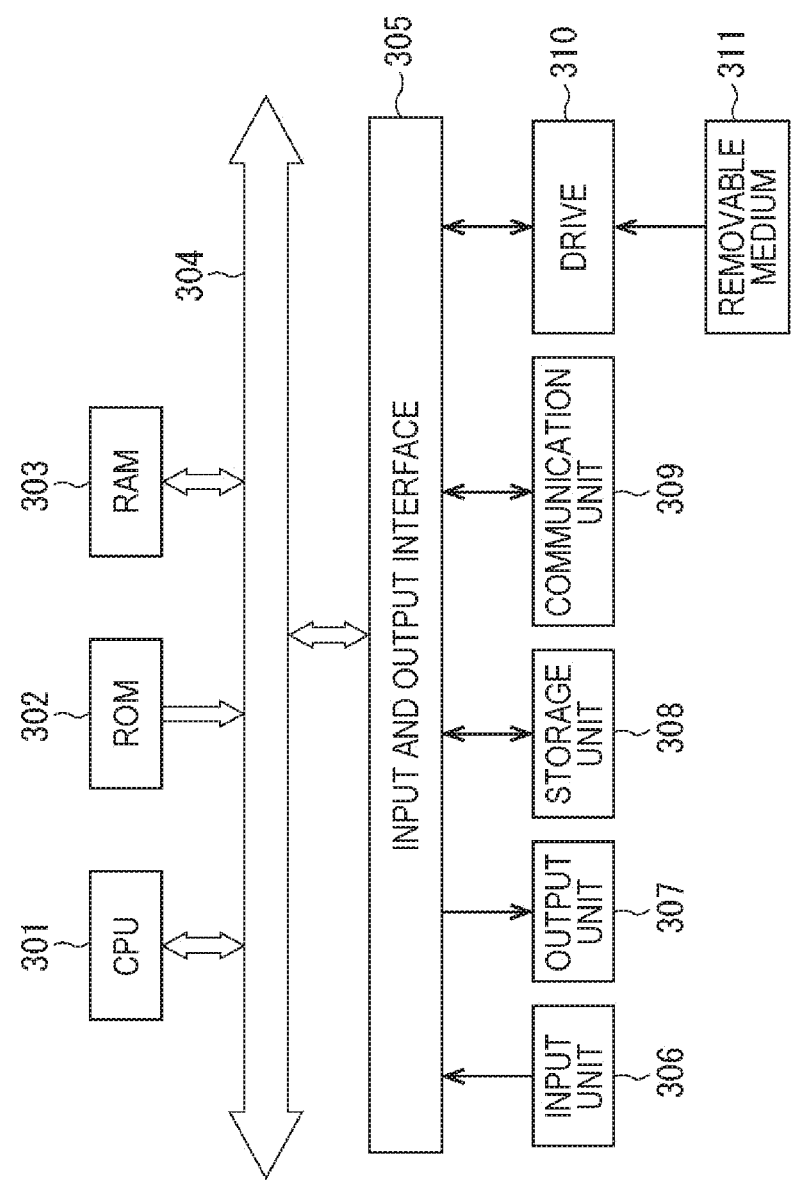
FIG. 32 is a block diagram showing a hardware configuration example of the server.

FIG. 32 is a block diagram showing an example of a hardware configuration of a computer that executes the above-described series of processing by a program.

A central processing unit (CPU) 301, a read only memory (ROM) 302, and a random access memory (RAM) 303 are mutually connected by a bus 304.

An input and output interface 305 is further connected to the bus 304. The input and output interface 305 is connected to an input unit 306 including a keyboard, a mouse, and the like, and an output unit 307 including a display, a speaker, and the like. Furthermore, the input and output interface 305 is connected to a storage unit 308 including a hard disk, a non-volatile memory, and the like, a communication unit 309 including a network interface and the like, and a drive 310 for driving a removable medium 311.

In the computer configured as described above, for example, the CPU 301 loads the program stored in the storage unit 308 into the RAM 303 via the input and output interface 305 and the bus 304, and executes the program, so that the above-described series of processing is performed.

The program to be executed by the CPU 301 is recorded on, for example, the removable medium 311 or provided via a wired or wireless transmission medium such as a local area network, the Internet, or digital broadcasting, and is installed in the storage unit 308.

The installed program is provided by being recorded on a removable medium 311 including an optical disc (compact disc-read only memory (CD-ROM), digital versatile disc (DVD), or the like), a semiconductor memory, and the like. Furthermore, the program may be provided via a wired or wireless transmission medium such as a local area network, the Internet, or digital broadcasting. The program can be installed in the ROM 302 or the storage unit 308 in advance.

Note that the program executed by the computer may be a program of processing in chronological order according to the order described in the present specification or may be a program of processing in parallel or at necessary timing such as when a call is made.

Furthermore, in this specification, a system means a set of a plurality of constituent elements (devices, modules (parts), or the like), and it does not matter whether or not all constituent elements are in the same casing. Therefore, a plurality of devices that is housed in separate housings and is connected via a network, and one device in which a plurality of modules is housed in one housing are both systems.

Note that the effects described in the present specification are merely examples and are not intended to be limiting, and other effects may be provided.

The embodiments of the present technology are not limited to the above-described embodiments, and various modifications are possible without departing from the gist of the present technology.

For example, in the present technology, it is possible to adopt a configuration of cloud computing in which one function is shared by a plurality of devices via a network, and is collaboratively processed.

Furthermore, each step described in the above-described flowchart can be executed by one device or shared by a plurality of devices.

Moreover, in a case where a plurality of processes is included in one step, a plurality of processes included in the one step can be executed by one device or shared by a plurality of devices.

<Example of Configuration Combination>

The present technology can adopt the following configuration.

(1)

An image processing device including:

a reception unit that receives a viewpoint image of a user that is an image viewed from a viewpoint of the user in a virtual space, a viewpoint image of another user viewed from a viewpoint of the another user, viewpoint position information indicating a position of the another user, and line-of-sight information indicating a line-of-sight direction of the another user; and a display control unit that controls display of the viewpoint image of the another user to be superimposed on the viewpoint image of the user on the basis of a positional relationship of the user and the another user in the virtual space determined using the viewpoint position information and the line-of-sight information of the another user.

(2)

The image processing device according to (1) described above, in which the display control unit controls at least one of position, size, or transparency of the viewpoint image of the another user.

(3)

The image processing device according to (1) or (2) described above, in which the display control unit controls display of the viewpoint image of the another user on the basis of information obtained from line-of-sight information indicating a line-of-sight direction of the user and the line-of-sight information of the another user.

(4)

The image processing device according to (3) described above, in which the information is a parallax, and the display control unit moves the viewpoint image of the another user to the center of the viewpoint image of the user as the information is a parallax, and as the parallax decreases.

(5)

The image processing device according to (4) described above, in which, in a case where the parallax is equal to or smaller than a first threshold, the display control unit causes the viewpoint image of the another user to be displayed larger.

(6)

The image processing device according to (5) described above, in which the display control unit moves the viewpoint image of the another user in a direction out of the visual field obtained from the line-of-sight information of the user as the parallax increases.

(7)

The image processing device according to (6) described above, in which the display control unit ends the display of the viewpoint image of the another user in a case where the parallax is equal to or larger than a second threshold that is larger than the first threshold.

(8)

The image processing device according to (3) described above, in which the information is a ratio at which the visual fields overlap with each other, and the display control unit increases at least one of the size or the transmittance of the viewpoint image of the another user as the ratio increases, and reduces at least one of the size or the transmittance of the viewpoint image of the another user as the ratio decreases.

(9)

The image processing device according to (8) described above, in which the display control unit ends the display of the viewpoint image of the another user in a case where the ratio is equal to or larger than a predetermined threshold.

(10)

The image processing device according to (9) described above, in which, after the display of the viewpoint image of the another user is ended, in a case where the ratio is equal to or smaller than the predetermined threshold, the display control unit restarts the display of the viewpoint image of the another user.

(11)

The image processing device according to (3) described above, in which, in a case where the user turns his/her face to the viewpoint image of the another user, the display control unit moves the viewpoint image of the another user toward the center of the visual field of the user.

(12)

The image processing device according to (11) described above, in which in a case where the viewpoint image of the another user has been static in a state of being positioned at the center of the visual field of the user, the display control unit causes a timer to be displayed on the viewpoint image of the another user.

(13)

The image processing device according to (12) described above, in which, in a case where the timer has been ended, the display control unit moves the viewpoint of the user to the viewpoint of the another user.

(14)

The image processing device according to (13) described above, in which, in a case where the user shifts his/her line-of-sight before the timer is ended, the display control unit ends the display of the viewpoint image of the another user.

(15)

The image processing device according to (14) described above, in which in a case where the viewpoint of the user or the viewpoint of the another user has moved, and a change in a direction vector of the viewpoint of the another user as viewed from the user is equal to or larger than a predetermined threshold, the display control unit restarts the display of the viewpoint image of the another user.

(16)

The image processing device according to any one of (3) to (15) described above, in which the line-of-sight information of the user is obtained from a sensor that detects movement of the user.

(17)

The image processing device according to (16) described above, in which the sensor is provided on a head mounted display.

(18)

The image processing device according to any one of (1) to (17) described above, in which bit rate distribution of the viewpoint image of the another user is changed on the basis of a size or transmittance of the viewpoint image of the another user.

(19)

An image processing method including:

by an image processing device, receiving a viewpoint image of a user that is an image viewed from a viewpoint of the user in a virtual space, a viewpoint image of another user viewed from a viewpoint of the another user, viewpoint position information indicating a position of the another user, and line-of-sight information indicating a line-of-sight direction of the another user; and controlling display of the viewpoint image of the another user to be superimposed on the viewpoint image of the user on the basis of a positional relationship of the user and the another user in the virtual space determined using the viewpoint position information and the line-of-sight information of the another user.

(20)

An image provision system including:

an image processing device including a reception unit that receives a viewpoint image of a user that is an image viewed from a viewpoint of the user in a virtual space, a viewpoint image of another user viewed from a viewpoint of the another user, viewpoint position information indicating a position of the another user, and line-of-sight information indicating a line-of-sight direction of the another user, and a display control unit that controls display of the viewpoint image of the another user to be superimposed on the viewpoint image of the user on the basis of a positional relationship of the user and the another user in the virtual space determined using the viewpoint position information and the line-of-sight information of the another user; and an image provision device including a transmission unit that transmits the viewpoint image of the user and the viewpoint image of the another user to the image processing device at bit rate distribution according to a size or a transmittance of the viewpoint image of the another user.

REFERENCE SIGNS LIST 1, 2 User
11-1, 11-2 HMD
Server
Free viewpoint image space model DB
32-1, 32-2 Viewpoint image generation unit
33-1 to
33-3 Viewpoint image compression unit
Multiplexing unit
Rate distribution control unit
51-1, 51-2 Image processing unit
Synthesis processing unit Display control unit
61-1, 61-2 Compression ERP image decoding processing unit
62-1, 62-2 Visual field image generation processing unit
Operation input unit
Output unit
201 CPU
202 Memory
203 Sensor unit
204 Input unit
205 Output unit
206 Communication unit
301 CPU
303 RAM
309 Communication unit

The invention claimed is:

1. An image processing device, comprising:
a central processing unit (CPU) configured to:
receive each of:
a first viewpoint image of a first user, wherein the first viewpoint image is viewable from a viewpoint of the first user in a virtual space,
a second viewpoint image of a second user, wherein the second viewpoint image is viewable from a viewpoint of the second user in the virtual space,
viewpoint position information that indicates a position of the second user, and
line-of-sight information indicating a line-of-sight direction of the second user;
control superimposition of the second viewpoint image of the second user on the first viewpoint image of the first user based on a positional relationship of the first user and the second user in the virtual space, wherein the positional relationship is based on the viewpoint position information and the line-of-sight information of the second user;
control display of each of the first viewpoint image, and the second viewpoint image, wherein the second viewpoint image is superimposed on the first viewpoint image as a sub-screen on a display screen of the first user; and
control change of at least one of a position of the displayed second viewpoint image, a size of the displayed second viewpoint image, or transparency of the displayed second viewpoint image based on line-of-sight information of the first user, wherein the line-of-sight information of the first user indicates a line-of-sight direction of the first user with respect to the sub-screen.

2. The image processing device according to claim 1, wherein the CPU is further configured to:
obtain specific information from the line-of-sight information of the first user and the line-of-sight information of the second user; and
control the display of the second viewpoint image based on the specific information.

3. The image processing device according to claim 2, wherein
the specific information indicates a parallax associated with the line-of-sight information of the first user, and
the CPU is further configured to control movement of the displayed second viewpoint image to a center of the displayed first viewpoint image based on decrease in the parallax.

4. The image processing device according to claim 3, wherein, in a case where the parallax is one of equal to or smaller than a first threshold, the CPU is further configured to control increase in the size of the displayed second viewpoint image.

5. The image processing device according to claim 4, wherein the CPU is further configured to control, based on increase in the parallax, the movement of the displayed second viewpoint image in a direction out of a visual field of the first user.

6. The image processing device according to claim 5, wherein
the CPU is further configured to control end of the display of the second viewpoint image in a case where the parallax is one of equal to or larger than a second threshold, and
the second threshold is larger than the first threshold.

7. The image processing device according to claim 2, wherein
the specific information indicates a ratio at which a visual field of the first user overlaps with a visual field of the second user, and
the CPU is further configured to:
control increase in at least one of the size or transmittance of the displayed second viewpoint image in a case where the ratio increases; and
reduce at least one of the size or the transmittance of the displayed second viewpoint image in a case where the ratio decreases.

8. The image processing device according to claim 7, wherein the CPU is further configured to control end of the display of the second viewpoint image in a case where the ratio is one of equal to or larger than a threshold.

9. The image processing device according to claim 8, wherein, after the end of the display of the second viewpoint image, the CPU is further configured to restart the display of the second viewpoint image in a case where the ratio is one of equal to or smaller than the threshold.

10. The image processing device according to claim 2, wherein
the CPU is further configured to control movement of the displayed second viewpoint image toward a center of a visual field of the first user, and
the movement of the displayed second viewpoint image toward the center of the visual field of the first user is controlled based on movement of the line-of-sight direction of the first user to the displayed second viewpoint image.

11. The image processing device according to claim 10, wherein
the CPU is further configured to control display of a timer on the displayed second viewpoint image based on a static state of the displayed second viewpoint image, and
the displayed second viewpoint image is in the static state at the center of the visual field of the first user.

12. The image processing device according to claim 11, wherein the CPU is further configured to:
control end of the display of the second viewpoint image based on end of the timer; and
control the display of the first viewpoint image based on the end of the display of the second viewpoint image, wherein the first viewpoint image is the same as the second viewpoint image.

13. The image processing device according to claim 11, wherein the CPU is further configured to:
control, based on a shift of a line-of-sight of the first user before the timer ends, end of the display of the second viewpoint image; and control the display of the first viewpoint image based on the end of the display of the second viewpoint image.

14. The image processing device according to claim 13, wherein the CPU is further configured to restart the display of the second viewpoint image based on:
   movement of at least one of the viewpoint of the first user or the viewpoint of the second user, and
   a change in a direction vector of the viewpoint of the second user with respect to the first user, wherein the change in the direction vector of the viewpoint of the second user is one of equal to or larger than a threshold.

15. The image processing device according to claim 2, wherein
   the CPU is further configured to obtain the line-of-sight information of the first user from a sensor, and
   the sensor detects movement of the first user.

16. The image processing device according to claim 15, wherein the sensor is on a head mounted display.

17. The image processing device according to claim 1, wherein bit rate distribution of the second viewpoint image is changeable based on one of the size or transmittance of the second viewpoint image.

18. An image processing method, comprising:
   receiving each of:
      a first viewpoint image of a first user, wherein the first viewpoint image is viewable from a viewpoint of the first user in a virtual space,
      a second viewpoint image of a second user, wherein the second viewpoint image is viewable from a viewpoint of the second user in the virtual space,
      viewpoint position information that indicates a position of the second user, and
      line-of-sight information indicating a line-of-sight direction of the second user;
   controlling superimposition of the second viewpoint image of the second user on the first viewpoint image of the first user based on a positional relationship of the first user and the second user in the virtual space, wherein the positional relationship is based on the viewpoint position information and the line-of-sight information of the second user;
   controlling display of each of the first viewpoint image, and the second viewpoint image, wherein the second viewpoint image is superimposed on the first viewpoint image as a sub-screen on a display screen of the first user; and
   controlling change of at least one of a position of the displayed second viewpoint image, a size of the displayed second viewpoint image, or transparency of the displayed second viewpoint image based on line-of-sight information of the first user, wherein the line-of-sight information of the first user indicates a line-of-sight direction of the first user with respect to the sub-screen.

19. An image provision system, comprising:
   an image processing device that includes a central processing unit (CPU) configured to:
   receive each of:
      a first viewpoint image of a first user, wherein the first viewpoint image is viewable from a viewpoint of the first user in a virtual space,
      a second viewpoint image of a second user, wherein the second viewpoint image is viewable from a viewpoint of the second user in the virtual space,
      viewpoint position information that indicates a position of the second user, and
      line-of-sight information indicating a line-of-sight direction of the second user;
   control superimposition of the second viewpoint image of the second user on the first viewpoint image of the first user based on a positional relationship of the first user and the second user in the virtual space, wherein the positional relationship is based on the viewpoint position information and the line-of-sight information of the second user;
   control display of each of the first viewpoint image, and the second viewpoint image, wherein the second viewpoint image is superimposed on the first viewpoint image as a sub-screen on a display screen of the first user; and
   control change of at least one of a position of the displayed second viewpoint image, a size of the displayed second viewpoint image, or transparency of the displayed second viewpoint image based on line-of-sight information of the first user, wherein the line-of-sight information of the first user indicates a line-of-sight direction of the first user with respect to the sub-screen; and
   an image provision device that includes circuitry configured to transmit the first viewpoint image and the second viewpoint image to the image processing device at bit rate distribution based on the size or the transparency of the second viewpoint image.

20. An image processing device, comprising:
   a central processing unit (CPU) configured to:
   receive each of:
      a first viewpoint image of a first user, wherein the first viewpoint image is viewable from a viewpoint of the first user in a virtual space,
      a second viewpoint image of a second user, wherein the second viewpoint image is viewable from a viewpoint of the second user in the virtual space,
      viewpoint position information that indicates a position of the second user, and
      line-of-sight information indicating a line-of-sight direction of the second user;
   control superimposition of the second viewpoint image of the second user on the first viewpoint image of the first user based on a positional relationship of the first user and the second user in the virtual space, wherein the positional relationship is based on the viewpoint position information and the line-of-sight information of the second user;
   control display of each of the first viewpoint image, and the second viewpoint image superimposed on the first viewpoint image; and
   obtain specific information from line-of-sight information of the first user and the line-of-sight information of the second user, wherein the specific information indicates a ratio at which a visual field of the first user overlaps with a visual field of the second user;
   control increase in at least one of a size or a transmittance of the displayed second viewpoint image in a case where the ratio increases;
   reduce at least one of the size or the transmittance of the displayed second viewpoint image in a case where the ratio decreases; and
   control end of the display of the second viewpoint image in a case where the ratio is one of equal to or larger than a threshold.

* * * * *